(12) United States Patent
Ye et al.

(10) Patent No.: US 12,282,222 B1
(45) Date of Patent: *Apr. 22, 2025

(54) ORGANIC SOLID CRYSTALS HAVING HELICAL STRUCTURES FORMED USING CHOLESTERIC LIQUID CRYSTALS

(71) Applicant: META PLATFORMS TECHNOLOGIES, LLC, Menlo Park, CA (US)

(72) Inventors: Sheng Ye, Redmond, WA (US); Ryan Li, Redmond, WA (US); Tingling Rao, Bellevue, WA (US); Lafe Joseph Purvis, II, Redmond, WA (US); Oleg Yaroshchuk, Redmond, WA (US); Tanya Malhotra, Frederick, MD (US); Andrew John Ouderkirk, Kirkland, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/493,738

(22) Filed: Oct. 24, 2023

Related U.S. Application Data

(62) Division of application No. 17/384,340, filed on Jul. 23, 2021, now Pat. No. 11,796,856.

(60) Provisional application No. 63/057,180, filed on Jul. 27, 2020.

(51) Int. Cl.
| | |
|---|---|
| *G02F 1/1333* | (2006.01) |
| *C08J 5/18* | (2006.01) |
| *C09K 19/12* | (2006.01) |
| *C09K 19/18* | (2006.01) |
| *C09K 19/20* | (2006.01) |
| *C09K 19/22* | (2006.01) |
| *C09K 19/24* | (2006.01) |
| *C09K 19/30* | (2006.01) |
| *C09K 19/34* | (2006.01) |
| *C09K 19/36* | (2006.01) |
| *G02F 1/1335* | (2006.01) |
| *C09K 19/58* | (2006.01) |

(52) U.S. Cl.
CPC .......... *G02F 1/133543* (2021.01); *C08J 5/18* (2013.01); *C09K 19/12* (2013.01); *C09K 19/18* (2013.01); *C09K 19/2007* (2013.01); *C09K 19/22* (2013.01); *C09K 19/24* (2013.01); *C09K 19/3003* (2013.01); *C09K 19/3068* (2013.01); *C09K 19/348* (2013.01); *C09K 19/36* (2013.01); *C09K 2019/123* (2013.01); *C09K 2019/188* (2013.01); *C09K 2019/2035* (2013.01); *C09K 2019/2042* (2013.01); *C09K 2019/2078* (2013.01); *C09K 2019/3004* (2013.01); *C09K 2019/301* (2013.01); *C09K 2019/3016* (2013.01); *C09K 2019/3075* (2013.01); *C09K 19/586* (2013.01)

(58) Field of Classification Search
CPC .... C09K 19/12; C09K 19/18; C09K 19/2007; C09K 19/22; C09K 19/24; C09K 19/3003; C09K 19/3068; C09K 19/348; C09K 19/36; C09K 19/586; C09K 2019/123; C09K 2019/188; C09K 2019/2035; C09K 2019/2042; C09K 2019/2078; C09K 2019/3004; C09K 2019/301; C09K 2019/3016; C09K 2019/3075; G02F 1/1333; G02F 1/133543
See application file for complete search history.

(56) References Cited

U.S. PATENT DOCUMENTS

| | | | |
|---|---|---|---|
| 5,326,496 A | 7/1994 | Iida et al. | |
| 6,800,220 B2 | 10/2004 | Yumoto et al. | |
| 6,846,540 B2 | 1/2005 | Yumoto et al. | |
| 6,917,399 B2 | 7/2005 | Pokorny et al. | |
| 11,796,716 B1* | 10/2023 | Ye | G02B 5/3083 |
| 11,796,856 B1* | 10/2023 | Ye | C09K 19/348 |
| 2024/0272473 A1* | 8/2024 | Cheng | G02F 1/133636 |

OTHER PUBLICATIONS

Non-Final Office Action mailed Nov. 18, 2022 for U.S. Appl. No. 17/384,340, filed Jul. 23, 2021, 9 pages.
Non-Final Office Action mailed Nov. 25, 2022 for U.S. Appl. No. 17/384,332, filed Jul. 23, 2021, 7 pages.
Notice of Allowance mailed Jun. 13, 2023 for U.S. Appl. No. 17/384,340, filed Jul. 23, 2021, 5 pages.

* cited by examiner

*Primary Examiner* — Geraldina Visconti
(74) *Attorney, Agent, or Firm* — Greenberg Traurig, LLP

(57) ABSTRACT

An optical film includes a plurality of helically arranged liquid crystals and organic solid crystal structures at least partially surrounding the plurality of helically arranged liquid crystals. A method of making the optical film includes obtaining a substrate with an alignment layer and a film of a first solution on the alignment layer. The first solution includes liquid crystals and organic crystal molecules. The liquid crystals form a plurality of helically arranged liquid crystals on the alignment layer. The method also includes forming organic solid crystal structures by crystallizing the organic crystal molecules. The organic solid crystal structures at least partially surround the plurality of helically arranged liquid crystals.

18 Claims, 8 Drawing Sheets

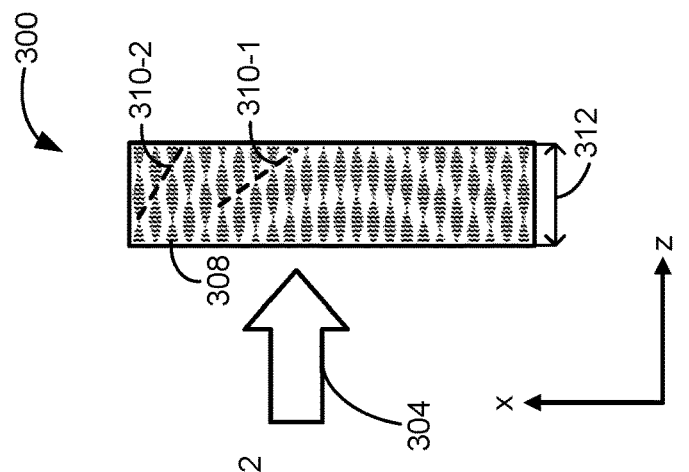
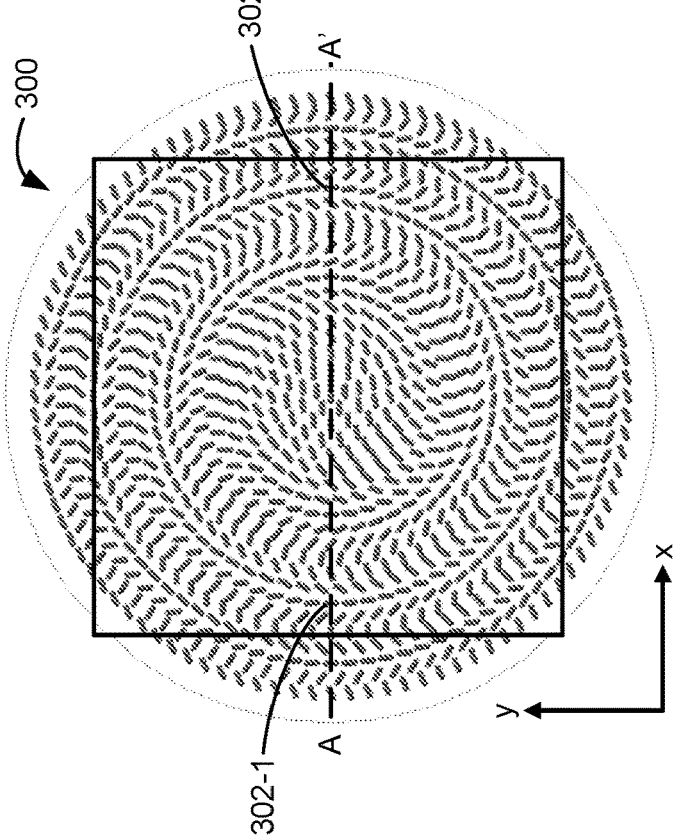
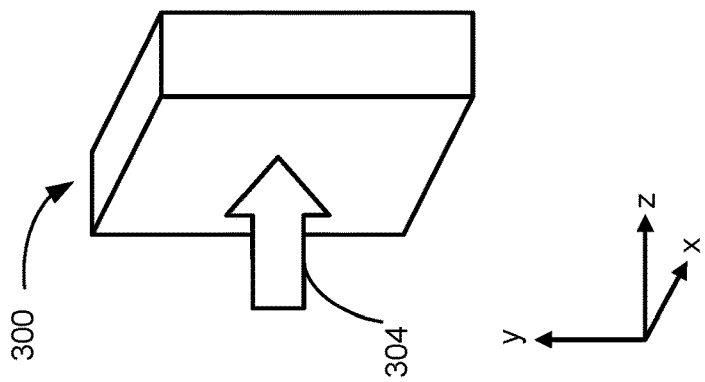
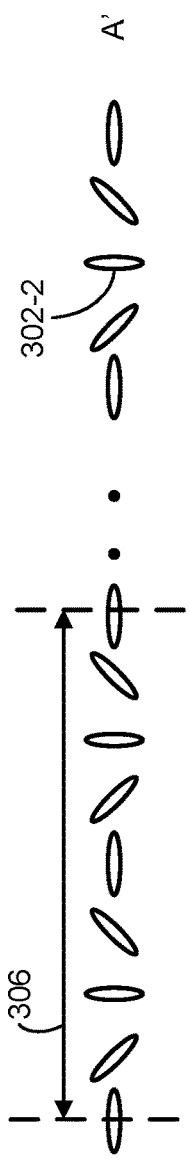
Figure 3A
Figure 3B
Figure 3C
Figure 3D

ORGANIC SOLID CRYSTALS HAVING HELICAL STRUCTURES FORMED USING CHOLESTERIC LIQUID CRYSTALS

RELATED APPLICATIONS

This application is a divisional application of U.S. patent application Ser. No. 17/384,340, filed Jul. 23, 2021, which claims the benefit of, and priority to, U.S. Provisional Patent Application 63/057,180, entitled "Organic Solid Crystals Having Helical Structures Formed Using Cholesteric Liquid Crystals" filed Jul. 27, 2020 and is related to U.S. patent application Ser. No. 17/384,332, entitled "Organic Solid Crystals Having Helical Structures Formed Using Negative Templates" filed Jul. 23, 2021, which claims priority to U.S. Provisional Patent Application Ser. No. 63/057,176, filed Jul. 27, 2020, all of which are incorporated by reference herein in their entities.

TECHNICAL FIELD

The present disclosure relates generally to optical films and, more specifically, to high refractive index optical films including organic crystals and methods of making such films.

BACKGROUND

Cholesteric liquid crystals (CLC) are widely used in polarization selective optical elements. CLCs formulated to achieve a high refractive index only reach a refractive index of 1.9. Optical elements based on materials having even higher refractive index are, however, highly desirable to reduce the size and weight of polarization selective optical elements and to enhance their optical characteristics. For example, increasing the refractive index improves the efficiency and selectivity of optical elements. Thus, there is a need for optical elements that include high refractive index material.

SUMMARY

In accordance with some embodiments, an optical film includes a plurality of helically arranged liquid crystals and organic solid crystal structures at least partially surrounding the plurality of helically arranged liquid crystals.

In accordance with some embodiments, a method of making an optical film includes obtaining a substrate with an alignment layer and a film of a first solution on the alignment layer. The first solution includes liquid crystals and organic crystal molecules. The liquid crystals form a plurality of helically arranged liquid crystals on the alignment layer. The method also includes forming organic solid crystal structures by crystallizing the organic crystal molecules. The organic solid crystal structures at least partially surround the plurality of helically arranged liquid crystals.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 3A-3D are schematic diagrams illustrating a polarization selective lens in accordance with some embodiments.

Figure 1:
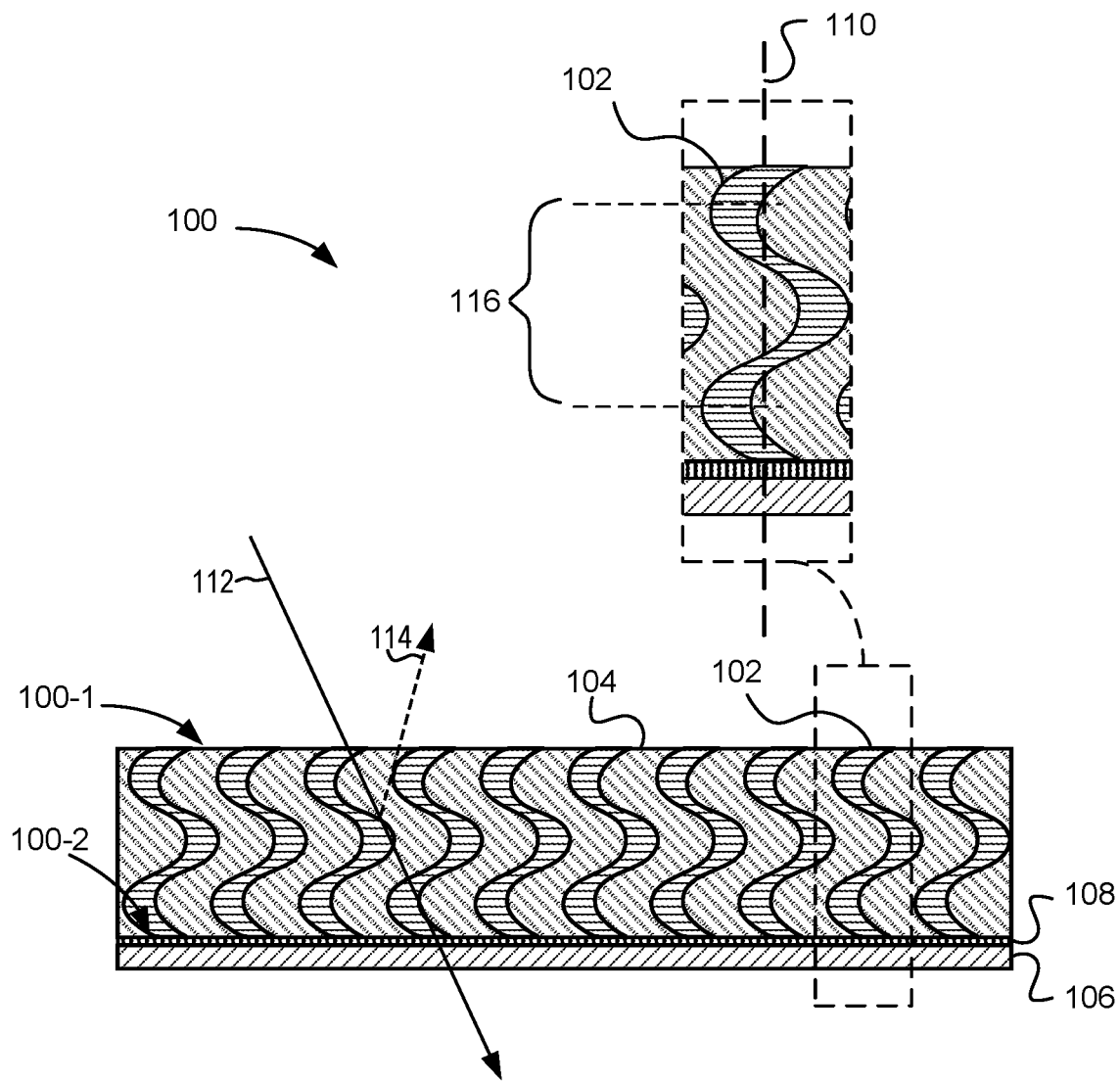
FIG. 1 is a schematic diagram illustrating an optical film in accordance with some embodiments.

These figures are not drawn to scale unless indicated otherwise.

DETAILED DESCRIPTION

Organic solid crystals can achieve a refractive index higher than 1.9, greater than what can be achieved with cholesteric liquid crystals (CLC). However, arranging organic crystals in helical structures (or negative helical structures) to form certain polarization selective optical elements has been challenging.

Described herein are methods to grow high index organic crystals in helical structures (or negative helical structures), which can be used to form high efficiency polarizers. The organic solid crystals are arranged in helical structures formed using a film of cholesteric liquid crystals (CLC) having helical shapes. The organic crystals are grown to at least partially surround the CLCs having the helical shapes, thereby conforming to the shapes of the CLCs. Thus, optical films including organic crystals that have (negative) helical structures and the refractive index higher than 1.9 can be made. Such optical films can be used to form high efficiency polarizers (e.g., reflective polarizers or diffractive polarizers). In some embodiments, the optical films operate as polarization selective lenses or gratings.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first retarder could be termed a second retarder, and, similarly, a second retarder could be termed a first retarder, without departing from the scope of the various described embodiments. The first retarder and the second retarder are both retarders, but they are not the same retarder. Similarly, a first direction could be termed a second direction, and, similarly, a second direction could be termed a first direction, without departing from the scope of the various described embodiments. The first direction and the second direction are both directions, but they are not the same direction.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind."

FIG. 1 is a schematic diagram illustrating optical film 100 in accordance with some embodiments. Optical film 100 includes helically shaped cholesteric liquid crystals (CLCs) (e.g., CLCs 102). CLCs 102 may be in a liquid crystal phase or in a polymerized phase. Each of the helically shaped CLCs 102 is at least partially surrounded by one or more solid organic crystal (e.g., organic crystals 104). For example, a respective CLC 102 structure is partially or fully in contact with, and laterally enclosed by, one or more organic crystals 104. In some embodiments, organic crystal 104 includes a single continuous crystal structure conforming to the helical shapes of CLCs 102. In some embodiments, organic crystals 104 include a plurality of crystal structures conforming to the shape of CLCs 102. In some embodiments, organic crystals 104 are grown from an interface with helically shaped CLCs 102, thereby forming organic crystals 104 having hollow helical structures (e.g., organic crystals 104 define helical tubes or cavities filled with CLCs 102). In some embodiments, organic crystals 104 conform to the helical shapes of CLCs 102 by at least partially filling a space laterally surrounding CLCs 102 (e.g., a space not occupied by CLCs 102). In some embodiments, organic crystals 104 form negative helical structures while CLCs 102 have positive helical structures. As used herein, a helical structure is positive when the structure occupies a space having a helical shape while a helical structure is negative when the space not occupied by the structure (e.g., a cavity defined by the structure) has a helical shape. In some embodiments, optical film 100 is coupled with a substrate (e.g., substrate 106 made of an optically transparent material) and/or an alignment layer (e.g., alignment layer 108) positioned between the substrate and CLCs 102 and organic crystals 104. In some embodiments, CLCs 102 have a weight ratio of above 50% to the total weight of optical film 100.

In some embodiments, organic crystals 104 have an index of refraction greater than 1.9, greater than 1.95, greater than 1.96, greater than 1.97, greater than 1.98, greater than 1.99, greater than 2.00, greater than 2.05, greater than 2.10, greater than 2.15, greater than 2.20, greater than 2.25, or greater than 2.30, or in a range between any two of the aforementioned refractive index values. In some embodiments, CLCs 102 have an index of refraction equal to or lower than 1.9. In some embodiments, CLCs 102 have an index of refraction ranging from 1.5 to 1.9, from 1.6 to 1.9, from 1.7 to 1.9, or from 1.8 to 1.9. In some embodiments, an index of refraction of optical film 100 (on average over the CLCs and the surrounding organic crystals) is at least 1.9.

In some embodiments, organic crystals 104 include one or more polycyclic aromatic hydrocarbons. In some embodiments, the polycyclic aromatic hydrocarbons include one or more of naphthalene, anthracene, tetracene, pentacene, pyrene, polycene, fluoranthene, benzophenone, benzochromene, benzil, benzimidazole, benzene, hexachlorobenzene, nitropyridine-N-oxide, benzene-1,4-dicarboxylic acid, diphenylacetylene, N-(4-nitrophenyl)-(s)-prolinal, 4,5-dicyanoimidazole, benzodithiophene, cyanopyridine, thienothiophene, stilbene, azobenzene, and their derivatives.

In some embodiments, organic crystals 104 include one or more organic ring structures that include one or more saturated cyclic compounds and one or more unsaturated aromatic compounds. In some embodiments, the one or more saturated cyclic compounds include one or more of cyclohexane, cyclopentane, tetrahydropyran, piperidine, tetrahydrofuran, pyrrolidine, tetrahydrothiophene and their derivatives. In some embodiments, the one or more unsaturated aromatic compounds include one or more of benzene, naphthalene, anthracene, thiophene, bi-phenyl, tolane, benzimidazole, diphenylacetylene, cyanopyridine, thienothiophene, dibenzothiophene, carbazole, silafluorene and their derivatives. In some embodiments, the one or more organic ring structures are coupled with one or more terminal groups. In some embodiments, the one or more terminal groups include one or more of $C_1$-$C_{10}$ alkyl, alkenyl, —CN, —NCS, —SCN, —SF$_5$, —Br, —Cl, —F, —OCF$_3$, —CF$_3$, mono- or polyfluorinated $C_1$-$C_{10}$ alkyl, and alkoxy.

In some embodiments, CLCs 102 include one or more chiral liquid crystals (e.g., cholesteric liquid crystals). A chiral liquid crystal possesses some form of asymmetry that prevents superposing the molecule on its mirror image by any combination of rotations and/or translations. Chiral liquid crystal molecules may form helical structures. In some embodiments, the helical structures are formed when the chiral liquid crystals are in an interaction with an alignment layer. In some embodiments, CLCs 102 include one or more chiral liquid crystals of the following formulas:

Formula 1-001

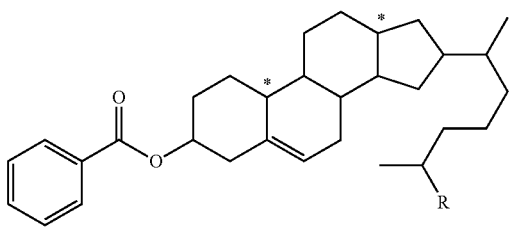

-continued

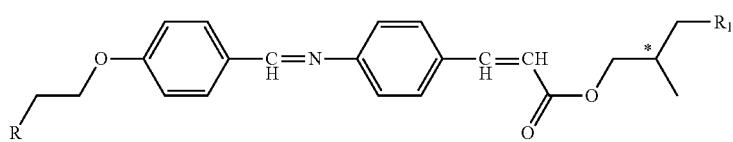
Formula 1-002

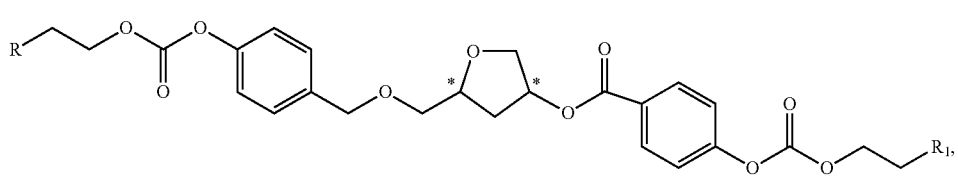
Formula 1-003 where R is either H or $(CH_2)_{n1}CH_2X_1$ and $R_1$ is either H or $(CH_2)_{n2}CH_2X_1$, where $X_1$ is acrylate, methacrylate, vinyl acrylate, or H, and where $n_1$ and $n_2$ range from zero to eight. An asterisk (*) indicates a chiral center of a chemical structure.

In some embodiments, CLCs 102 include one or more chiral liquid crystals selected from the following formulas:

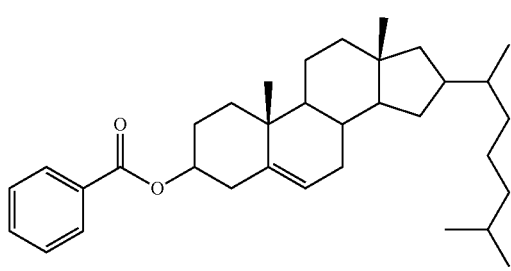
Formula 2-001

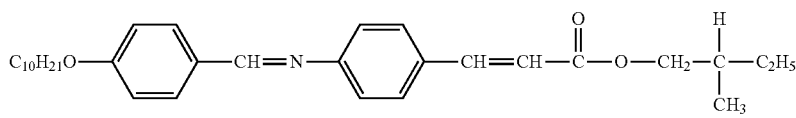
Formula 2-002

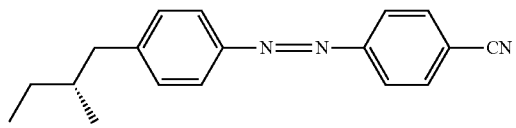
Formula 2-003

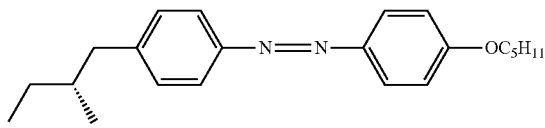
Formula 2-004

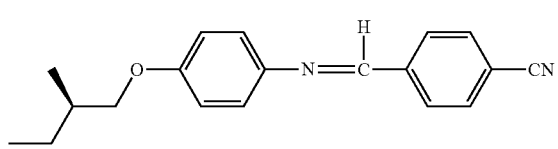
Formula 2-005

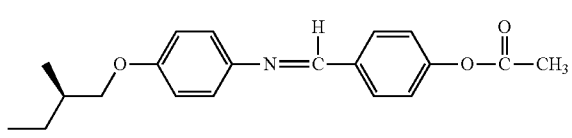
Formula 2-006

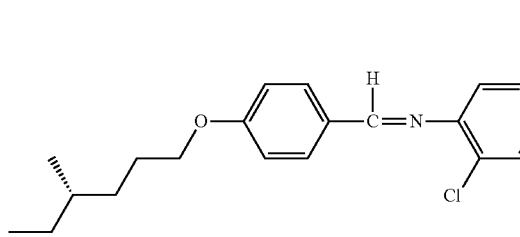
Formula 2-007

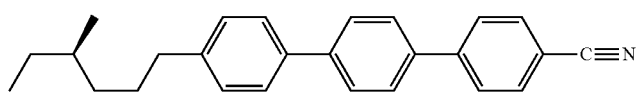
Formula 2-008

-continued
Formula 2-009
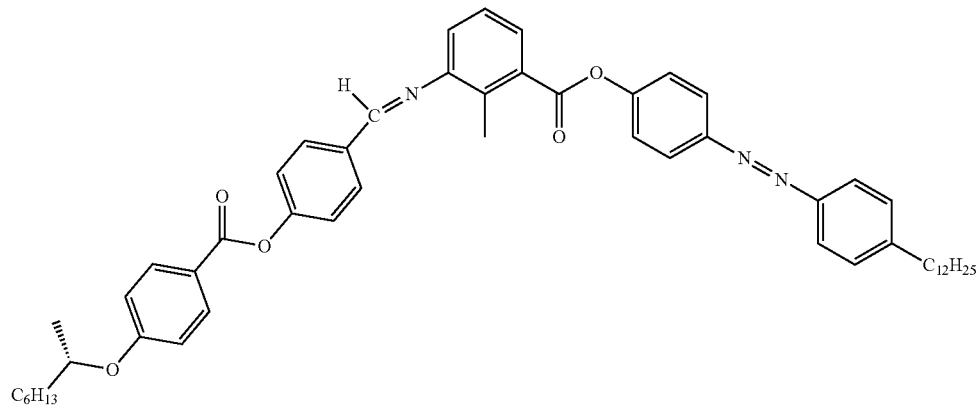
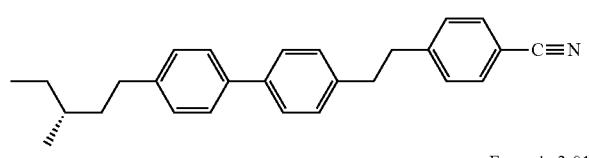
Formula 2-010
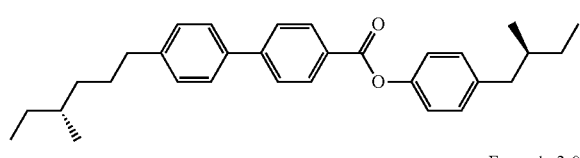
Formula 2-011
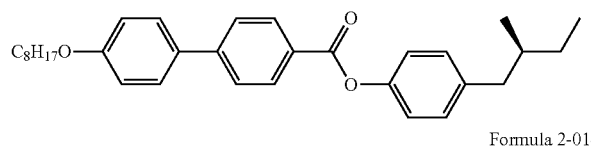
Formula 2-012
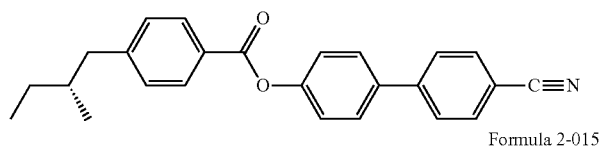
Formula 2-013
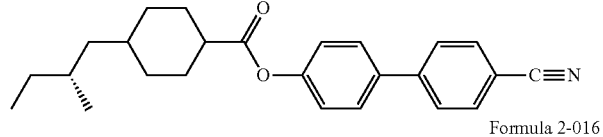
Formula 2-014
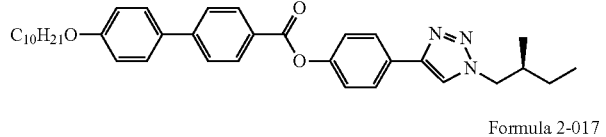
Formula 2-015
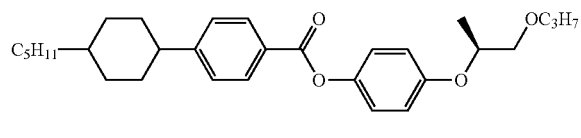
Formula 2-016
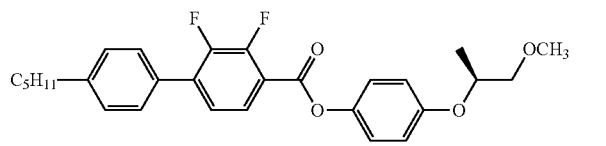
Formula 2-017
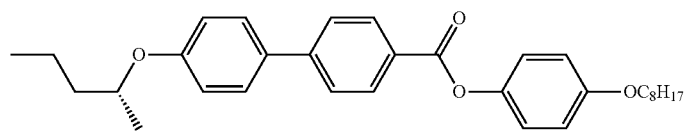
Formula 2-018
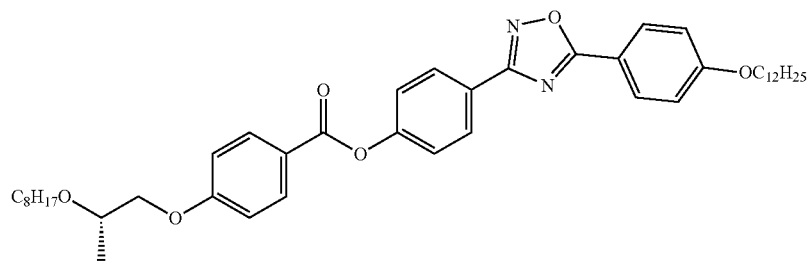
Formula 2-019
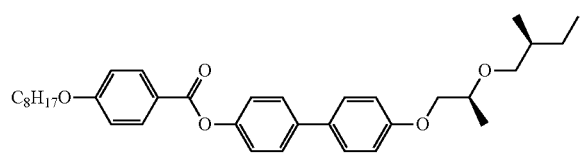
Formula 2-020
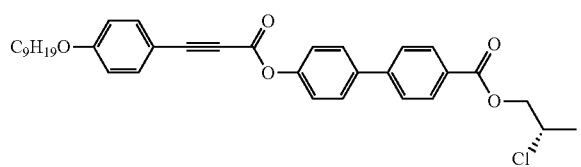
Formula 2-021

-continued
Formula 2-022
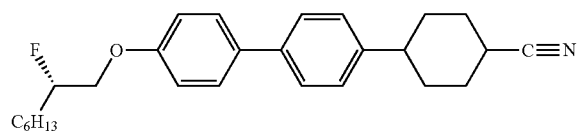
Formula 2-023
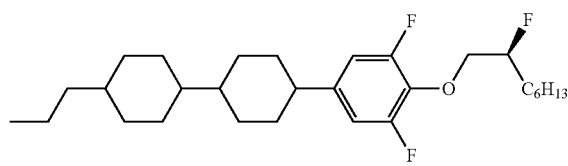
Formula 2-024
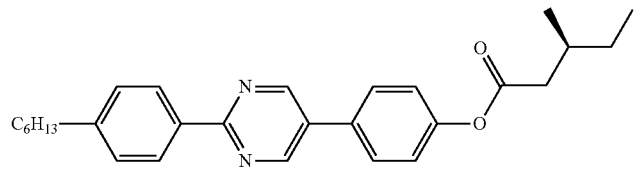
Formula 2-025
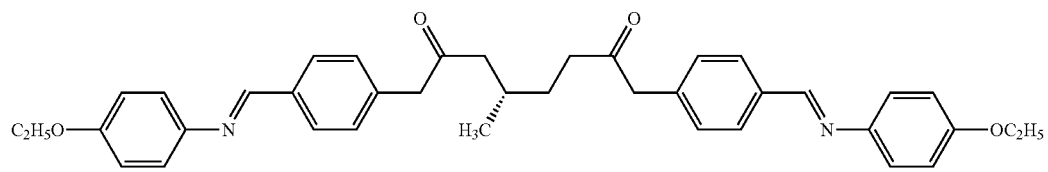
Formula 2-026
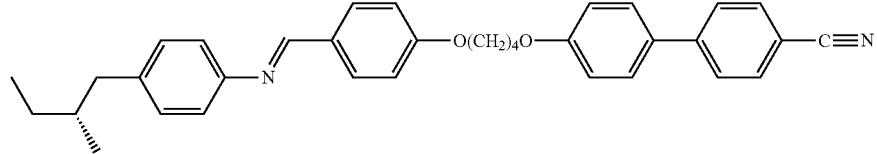
Formula 2-027
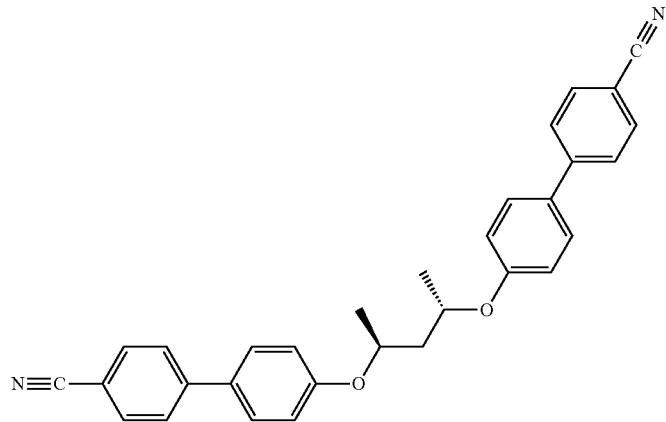
Formula 2-028
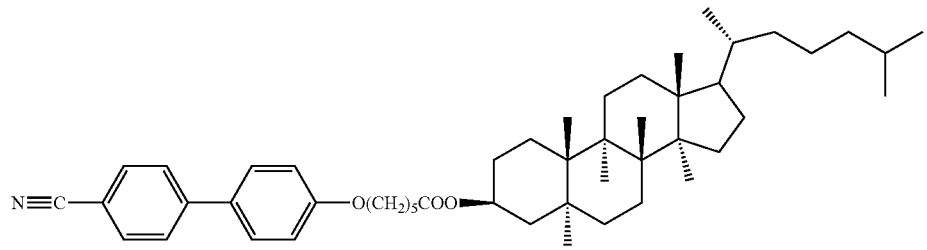

Formula 2-029
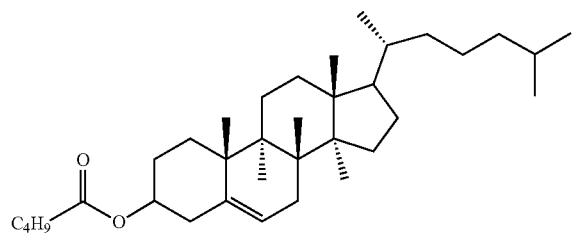
Formula 2-030
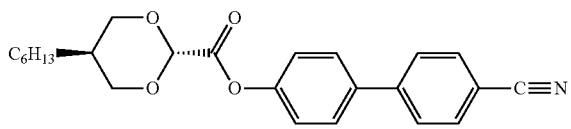
Formula 2-031
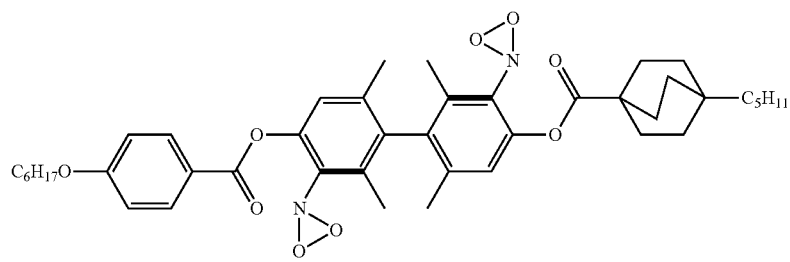
Formula 2-032
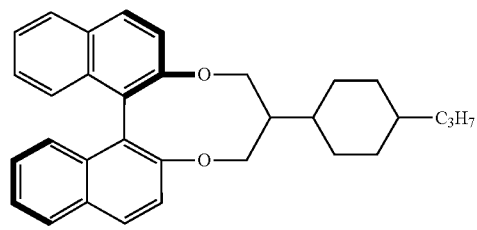
Formula 2-033
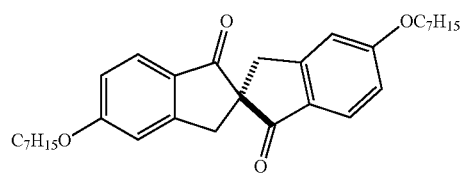
Formula 2-034
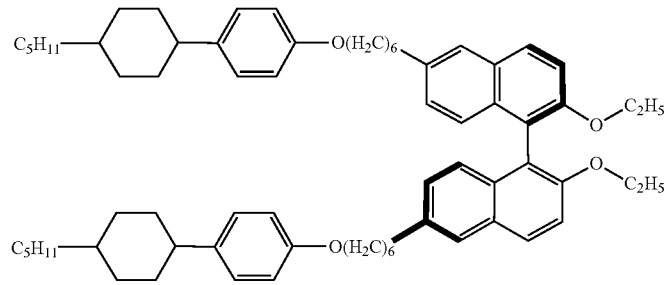

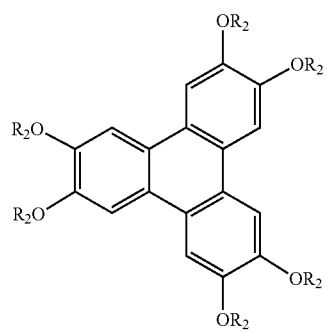
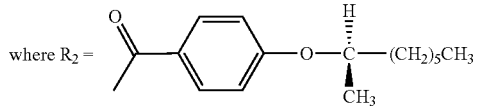

where $R_2 =$

Formula 2-035

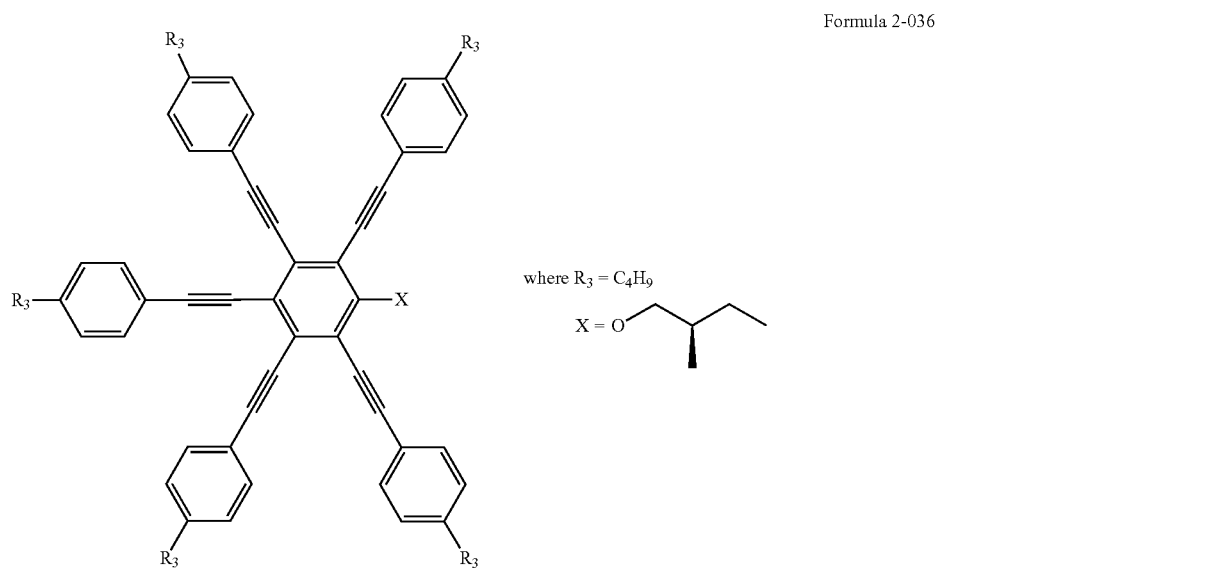

where $R_3 = C_4H_9$ $X = $ O-CH₂-CH(CH₃)-CH₂-CH₃

Formula 2-036

In some embodiments, CLCs 102 includes one or more non-chiral (e.g., non-cholesteric) liquid crystals. In some embodiments, the non-chiral liquid crystals include one or more of $R_4$-A-[$L_1$]-B-[$L_2$]-C-[$L_3$]-D-$R_5$, where $R_4$ and $R_5$ are terminal groups selected from R', R'O, CN, NCS, $CF_3$, F, Cl, $NO_2$, alkenyl, OO=C—$CH_3$=$CH_2$, OO=C—CH=$CH_2$, where R' is $C_nH_{2n+1}$, where A, B, C, and D are individually selected from the following formulas:

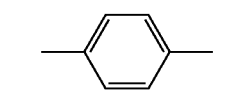

Formula 3-001

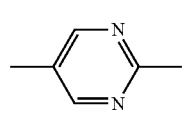

Formula 3-002

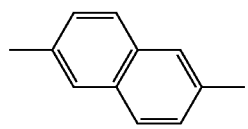

Formula 3-003

Formula 3-004

Formula 3-005

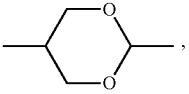

Formula 3-006 and where $L_1$, $L_2$, and $L_3$ are linking groups including any of a carbon single bond, a carbon double bond, a carbon triple bond, —COO—, $CH_2CH_2$—, $CH_2O$—, —CH=N—, —N=N—, and —N(O)=N—.

In some embodiments, the non-chiral liquid crystals include one or more of the following formulas:

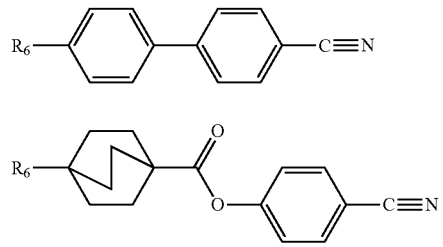
Formula 4-001
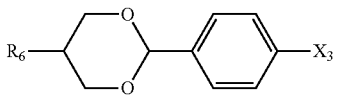
Formula 4-002
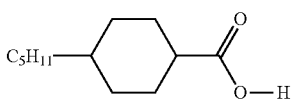
Formula 4-003
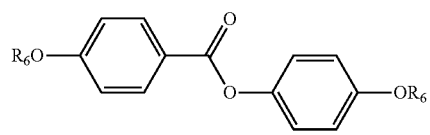
Formula 4-004
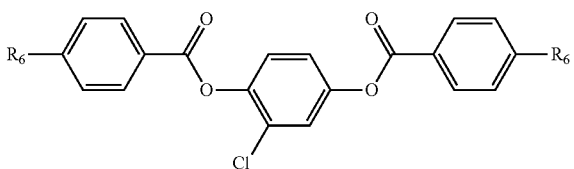
Formula 4-005
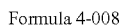
Formula 4-006
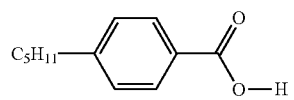
Formula 4-007
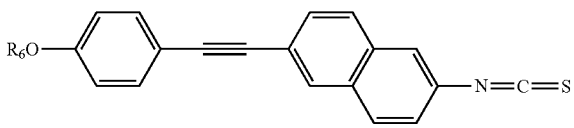
Formula 4-008
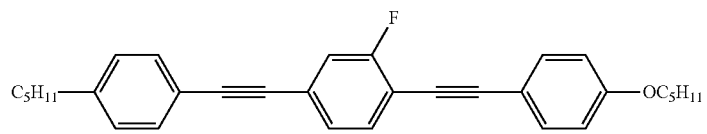
Formula 4-009
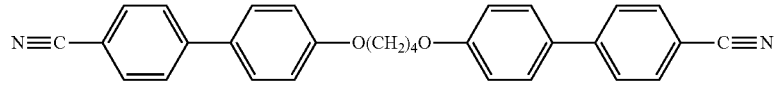
Formula 4-010
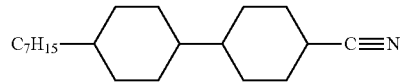
Formula 4-011
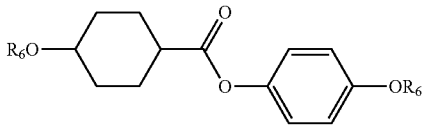
Formula 4-012
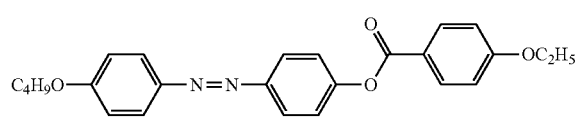
Formula 4-013
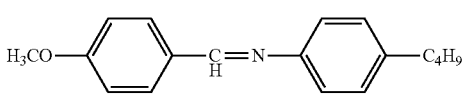
Formula 4-014
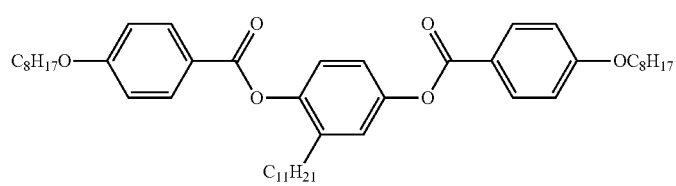
Formula 4-015
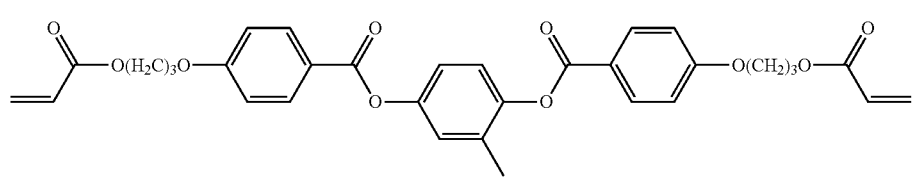
Formula 4-016
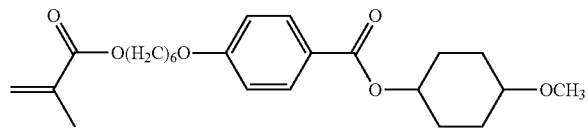
Formula 4-017

-continued

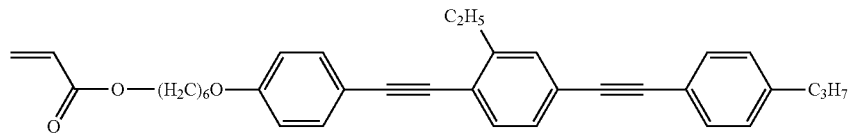

Formula 4-019

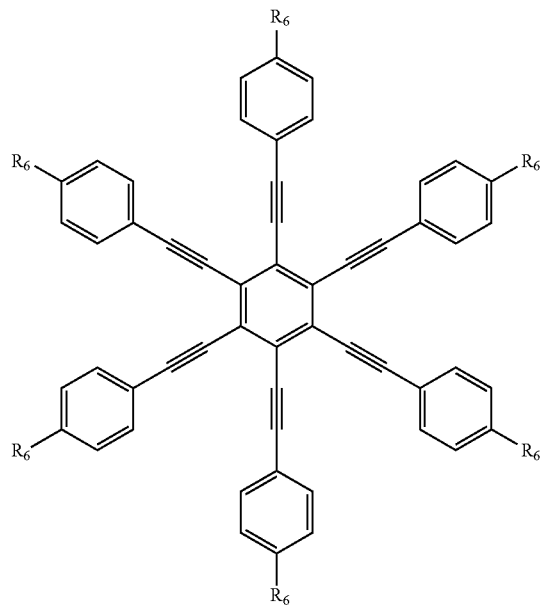

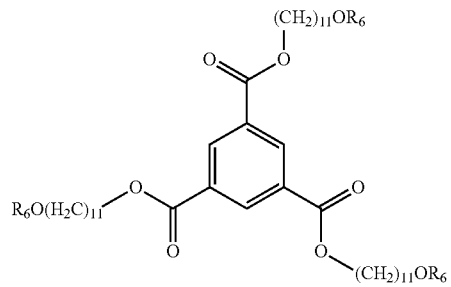

Formula 4-018

Formula 4-020 where $R_6$ is selected from $C_nH_{2n+1}$ and $C_nH_{2n+1}O$ and $X_3$ is a terminal group selected from R', R'O, CN, NCS, $CF_3$, F, Cl, $NO_2$, alkenyl, OO=C—$CH_3$=$CH_2$, OO=C—CH=$CH_2$, where R' is $C_nH_{2n+1}$.

In some embodiments, CLCs 102 further include one or more chiral dopants. A chiral dopant assists formation of helical structures, such as CLCs 102, from non-chiral liquid crystals. For example, non-chiral liquid crystals, such as those listed above, form helical structures upon interaction with one or more chiral dopants. In some embodiments, a chiral dopant may assist formation of helical structures from chiral liquid crystals. In some embodiments, the one or more chiral dopants include one or more of the following formulas:

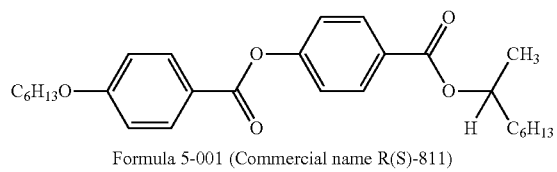

Formula 5-001 (Commercial name R(S)-811)

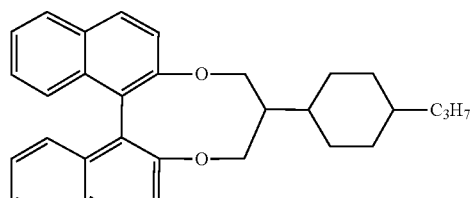

Formula 5-002 (Commercial name R(S)-5011)

-continued

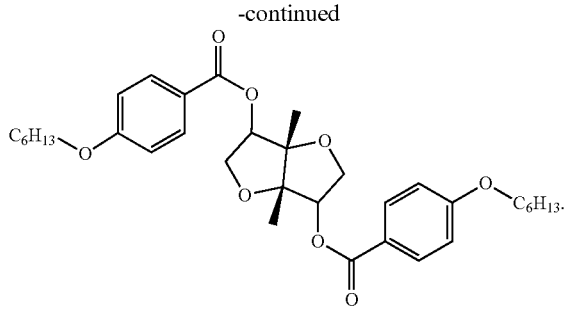

Formula 5-003 (Commercial name R(S)-ISO(6OBA)$_2$)

As shown in FIG. 1, helically shaped CLCs 102 that are at least partially surrounded laterally by organic crystals 104 extend between a first surface and a second surface of optical film 100 (e.g., between surfaces 100-1 and 100-2). Helically shaped CLCs 102 define a helical axis (e.g., helical axis 110) substantially perpendicular to surface 100-1 and/or surface 100-2. In some embodiments, organic crystals 104 at least partially surrounding helically shaped CLCs 102 have negative helical shapes or shapes of hollow helical tubes. In some embodiments, the helical structures of organic crystals 104 also at least partially extend between surfaces 100-1 and 100-2 of optical film 100.

Optical properties of optical film 100 arising from its helical structures are explained below with respect to CLCs 102. However, it is understood that organic crystals 104 at least partially surrounding CLCs 102 possess similar properties to those of CLCs 102, with the exception that organic crystals 104 have a higher index of refraction.

In some embodiments, CLCs 102 have a pitch (e.g., pitch 116 also referred to as periodicity) defined as a distance along its helical axis 110 at which an azimuth angle of a helical crystal has rotated 360 degrees. In FIG. 1, CLCs 102 of optical film 100 have a constant pitch. In some embodiments, CLCs 102 of optical film 100 have a gradually or incrementally varying pitch along helical axis 110. For example, the helically shaped organic crystals have two or more pitches along helical axis 110. In some embodiments, different pitches of the helical configurations are achieved by controlling a concentration and/or a type of a chiral dopant used for forming the helical configurations.

In some embodiments, a pitch of the helical configuration determines the wavelength selectivity of optical film 100. A liquid crystal layer having a constant pitch is configured to redirect light at a narrow wavelength range (e.g., a narrow-band reflective polarizer). In some embodiments, a narrow wavelength range corresponds to a bandwidth (e.g., a full-width at half-maximum) of 100 nm or less (e.g., 50 nm, 30 nm, 20 nm, 10 nm, 5 nm, or 1 nm or less). For example, optical film 100 having a constant pitch selective for green color is configured to redirect light between 495 nm and 570 nm. In some embodiments, an optical film having a varying pitch (CLCs 102 have a range of pitches) is used to reflect light of a broad wavelength range (e.g., a broadband reflective polarizer). For example, a first region of optical film corresponding to a first pitch redirects a first wavelength range, a second region of optical film corresponding to a second pitch redirects a second wavelength range, and a third region of optical film 100 corresponding to a third pitch redirects a third wavelength range. The first pitch, the second pitch, and the third pitch are distinct from each other. In some embodiments, a broad wavelength range corresponds to a bandwidth (e.g., a full-width at half-maximum) of 150 nm or more (e.g., 200 nm, 250 nm, 300 nm, 350 nm, 400 nm, etc.).

In some embodiments, CLCs 102 and organic crystals 104 define a plurality of diffractive planes extending across optical film 100. The diffractive planes redirect respective portions of incident light (e.g., portion 114 of incident light 112) received by optical film 100. For example, optical film 100 having CLCs 102 with pitch 116 diffracts portion 114 of incident light 112 corresponding to a particular wavelength range.

In some embodiments, optical film 100 is an optical polarizer (e.g., a reflective or diffractive optical polarizer). In some embodiments, optical film 100 is selective with respect to handedness, an incident angle, and/or a wavelength range of light incident thereon. For example, for optical film 100 configured to diffract a circularly polarized light with a predefined handedness (and within a predefined incident angle range and within a predefined wavelength range), when a circularly polarized light having the predefined handedness (and an incident angle within the predefined incident angle and a wavelength within the predefined wavelength range) impinges on the optical film, the optical film layer diffracts the circularly polarized light (without diffracting an orthogonally polarized light). While reflectively diffracting the light, optical film 100 maintains the polarization of the reflectively diffracted light (e.g., a left-handed light is reflectively diffracted as the left-handed light). In comparison, optical film 100 forgoes diffracting light that does not have the predefined handedness (and does not have an incident angle within the predefined incident angle or does not have a wavelength within the predefined wavelength range). For example, optical film 100 configured to reflectively diffract a right-handed circularly polarized (RCP) light redirects the RCP light without changing its polarization while transmitting a left-handed circularly polarized (LCP) light without changing its polarization or direction (e.g., CLCs 102 may reflectively diffract light having a first circular polarization and a first wavelength range and transmit light having a polarization distinct from the first circular polarization and/or light having a wavelength distinct from the first wavelength range). In some embodiments, optical film 100 is wavelength-dependent. Thus, if an incident light with the predefined handedness (e.g., RCP) and an incident angle within the predefined incident angle range has a wavelength corresponding to a predefined wavelength range, CLCs 102 reflectively diffract the RCP light while maintaining its polarization. In comparison, an incident light (with or without the predefined handedness (e.g., RCP) and with an incident angle within the predefined incident angle range) having a wavelength outside the predefined wavelength range is transmitted through CLCs 102 without redirection while maintaining its polarization. In some embodiments, optical film 100 is specific to the incident angle. Thus, if an incident light with the predefined handedness (e.g., RCP) and a wavelength within the predefined wavelength range has an incident angle within the designed incident angle range, CLCs 102 redirect the RCP light without converting the polarization of the redirected light. In comparison, an incident light (with or without the predefined handedness (e.g., RCP) and a wavelength within the predefined wavelength range) having an incident angle outside the designed incident angle range is transmitted through CLCs 102 without redirection while maintaining its polarization.

As shown in FIG. 1, in some embodiments, optical film 100 is coupled with a substrate (e.g., substrate 106 made of an optically transparent material) and/or an alignment layer (e.g., alignment layer 108). In some embodiments, substrate 106 is made of an optical transparent materials (e.g., glass, quarts, or plastic). In some embodiments, substrate 106 is configured to provide mechanical support for optical film 100. Alignment layer 108 is disposed between substrate 106 and optical film 100. Alignment layer 108 is configured to interact with liquid crystals in a solution so that the liquid crystals form CLCs 102. In some embodiments, alignment layer 108 is a photoalignment layer or a patterned alignment layer.

FIGS. 2A-2E are schematic diagrams illustrating a method of fabricating optical film 200 in accordance with some embodiments. In some embodiments, optical film 200 corresponds to optical film 100 described above with respect to FIG. 1.

Figure 2A:
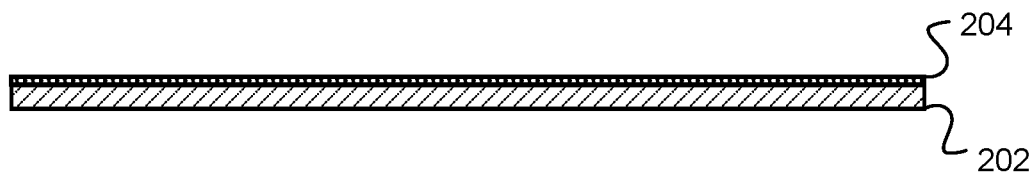
FIGS. 2A-2E are schematic diagrams illustrating a method of fabricating an optical film in accordance with some embodiments.

FIG. 2A shows obtaining a substrate (e.g., substrate 202) with an alignment layer (e.g., alignment layer 204). In some embodiments, substrate 202 is made of an optically transparent materials (e.g., glass, quarts, or plastic). Substrate 202 is configured to provide a mechanical support platform for fabricating optical film 200. Alignment layer 204 is configured to interact with a solution of liquid crystal molecules and organic crystal molecules to form an aligned array of helical structures (e.g., CLCs 102 at least partially surrounded by organic crystal 104).

In some embodiments, alignment layer 204 is a photoalignment layer. In some embodiments, the photoalignment layer interacts with a liquid crystal solution thereby aligning the cholesteric liquid crystals to a desired orientation. In such embodiments, obtaining substrate 202 with alignment layer 204 incudes applying a layer of photoalignment material on a surface of substrate 202 and exposing the layer of photoalignment material to light (e.g., to an intersection of two beams).

In some embodiments, alignment layer 204 includes a pattern (e.g., a microstructured pattern) on the surface of substrate 202. In some embodiments, the pattern interacts with a solution including liquid crystals thereby aligning the cholesteric liquid crystals to a desired orientation. In such embodiments, obtaining substrate 202 with alignment layer 204 includes pretreating the surface of substrate 202 to form an alignment pattern. In some embodiment, the substrate pretreatment includes one or more of a plasma treatment (e.g., $CF_4$ plasma), thermal treatment, e-beam exposure, ultraviolet (UV) exposure, or UV-ozone exposure. In some embodiments, the substrate pretreatment includes applying a solvent coating of nanoparticles or self-assembled monolayer on the surface of substrate 202. The coating may be applied by spin coating or electrospray coating. In some embodiments, substrate pretreatment includes mechanically rubbing the surface of substrate 202.

In some embodiments, the substrate pretreatment includes forming an obliquely deposited layer of inorganic material (e.g., SiOx) on the surface of substrate 202. In some embodiments, the pretreatment includes forming a layer of organic or inorganic material obliquely etched by an ion beam. In some embodiments, the substrate pretreatment is conducted with a patterned mask (negative patterning) or by laser writing to pattern the alignment layer (positive patterning). In some embodiments, the substrate pretreatment is conducted through a photoresist layer by using ultraviolet (UV) light to form the pattern.

In some embodiments, the substrate pretreatment enables orientation of CLCs 102 on alignment layer 108 and control of a distance between any two adjacent CLC helical structures. In some embodiments, the substrate pretreatment improves wettability and/or adhesion of the substrate surface, increases or decreases roughness of the substrate surface, increases or decreases a surface energy (e.g., as positive/negative charges), hydrophilicity and/or lipophilicity of the substrate surface. In some embodiments, the substrate pretreatment generates nucleation sites and/or controls the nucleation sites for organic solid crystallization to achieve a desired crystal orientation and/or pattern during growth of organic crystals 104.

Figure 2B:
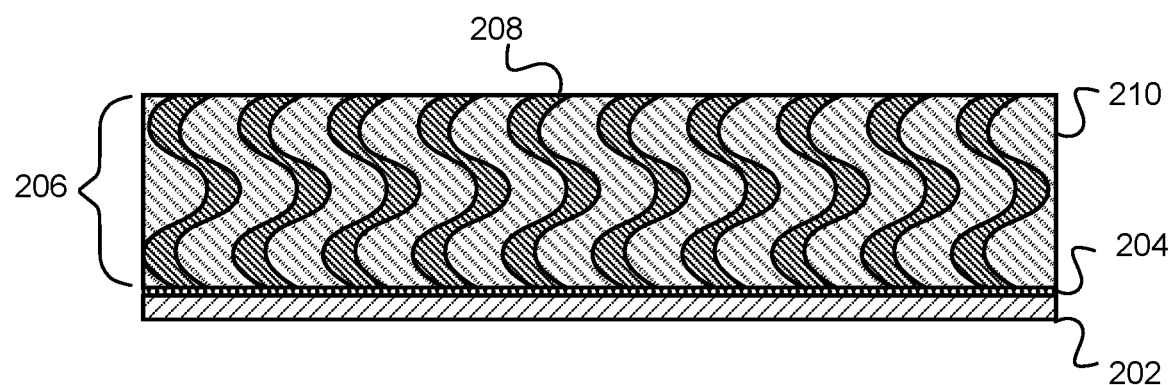

FIG. 2B shows applying a film of a solution (e.g., solution 206) on substrate 202 having alignment layer 204. Solution 206 includes a mixture of liquid crystals and organic crystal molecules. The liquid crystals include one or more chiral liquid crystals and/or one or more non-chiral liquid crystals. In some embodiments, solution 206 further includes one or more chiral dopants. In some embodiments, solution 206 further includes a solvent. Upon interaction with alignment layer 204, the liquid crystals of solution 206 form helical structures (e.g., CLCs 208). Consequently, organic crystal molecules (e.g., organic crystal molecules 210) conform to CLCs 208 (e.g., occupy space not filled by CLCs 208) so that organic crystal molecules 210 at least partially surround CLCs 208 laterally.

In some embodiments, CLCs 208 include one or more chiral liquid crystals (e.g., one or more cholesteric liquid crystals). In some embodiments, the one or more chiral liquid crystals include one or more liquid crystals selected from formulas 1-001 to 1-003 described above with respect to FIG. 1. In some embodiments, the one or more chiral liquid crystals include one or more molecules selected from formulas 2-001 to 2-036. In some embodiments, CLCs 208 include, instead of or in addition to the one or more chiral liquid crystals, one or more non-chiral liquid crystals (e.g., one or more non-cholesteric liquid crystals). In some embodiments, the non-cholesteric liquid crystals include one or more of $R_4$-A-[$L_1$]-[B-[$L_2$]-C-[$L_3$]-D-$R_5$, where $R_4$ and $R_5$ are terminal groups selected from R', R'O, CN, NCS, $CF_3$, F, Cl, $NO_2$, alkenyl, OO=C—$CH_3$=$CH_2$, OO=C—CH=$CH_2$, where R' is $C_nH_{2n+1}$, where A, B, C, and D are individually selected from the formulas from 3-001 to 3-006 described above with respect to FIG. 1, and where $L_1$, $L_2$, and $L_3$ are linking groups including any of a carbon single bond, a carbon double bond, a carbon triple bond, —COO—, $CH_2CH_2$—, $CH_2O$—, —CH=N—, —N=N—, and —N(O)=N—. In some embodiments, the one or more non-chiral liquid crystals include one or more liquid crystals selected from formulas 4-001 to 4-020 described above with respect to FIG. 1. In some embodiments, solution 206 further includes one or more chiral dopants for assisting formation of CLCs 208. In some embodiments, the one or more chiral dopants are selected from formulas 5-001, 5-002, and 5-003 described above with respect to FIG. 1.

In some embodiments, organic crystal molecules 210 include one or more polycyclic aromatic hydrocarbons. In some embodiments, the polycyclic aromatic hydrocarbons include one or more of naphthalene, anthracene, tetracene, pentacene, pyrene, polycene, fluoranthene, benzophenone, benzochromene, benzil, benzimidazole, benzene, hexachlorobenzene, nitropyridine-N-oxide, benzene-1,4-dicarboxylic acid, diphenylacetylene, N-(4-nitrophenyl)-(s)-prolinal, 4,5-dicyanoimidazole, benzodithiophene, cyanopyridine, thienothiophene, stilbene, azobenzene, and their derivatives.

In some embodiments, organic crystal molecules 210 include one or more organic ring structures that include one or more saturated cyclic compounds and one or more unsaturated aromatic compounds. In some embodiments, the one or more saturated cyclic compounds include one or more of cyclohexane, cyclopentane, tetrahydropyran, piperidine, tetrahydrofuran, pyrrolidine, tetrahydrothiophene and their derivatives. In some embodiments, the one or more unsaturated aromatic compounds include one or more of benzene, naphthalene, anthracene, thiophene, bi-phenyl, tolane, benzimidazole, diphenylacetylene, cyanopyridine, thienothiophene, dibenzothiophene, carbazole, silafluorene and their derivatives. In some embodiments, the one or more organic ring structures are coupled with one or more terminal groups. In some embodiments, the one or more terminal groups include one or more of $C_1$-$C_{10}$ alkyl, alkenyl, —CN, —NCS, —SCN, —$SF_5$, —Br, —Cl, —F, —$OCF_3$, —$CF_3$, mono- or polyfluorinated $C_1$-$C_{10}$ alkyl, and alkoxy.

Figure 2C:
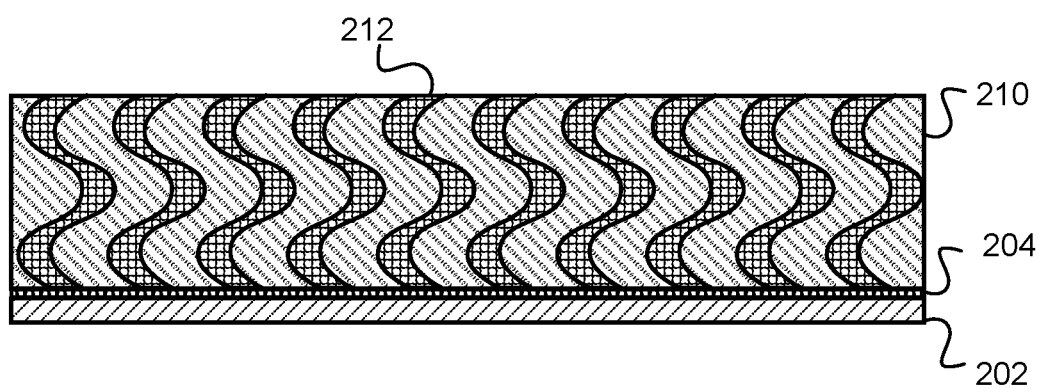

FIG. 2C shows polymerizing CLCs 212 to form polymerized CLCs 212 in some embodiments. The polymerization induces covalent boding between liquid crystal molecules of polymerized CLCs 212. The polymerization stabilizes CLCs 212 thereby forming a helical template for growing organic crystals from organic crystal molecules 210. The polymerization is performed by polymerization methods known in the art. In some embodiments, the polymerization includes exposing CLCs 212 to heat and/or light (e.g., UV light). In some embodiments, polymerizing CLCs 212 is not necessary and thus, is forgone.

Figure 2D:
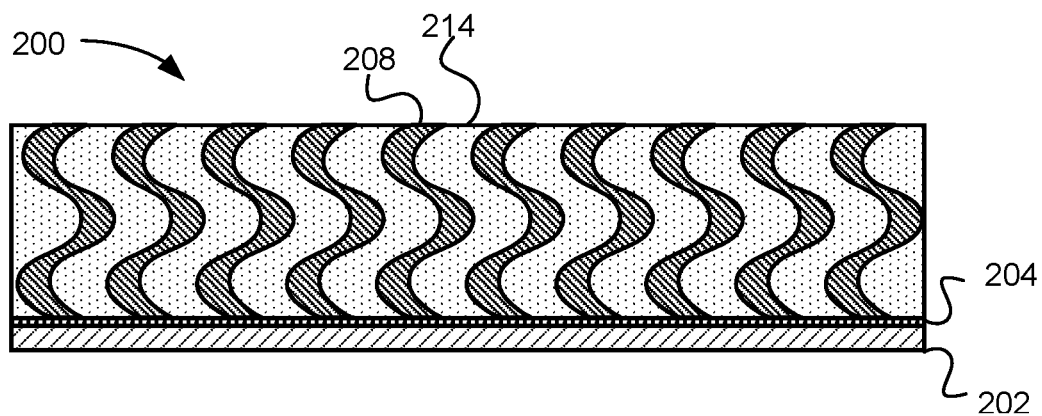

FIG. 2D shows growing organic crystals 214 from organic crystal molecules 210 (e.g., crystallizing organic crystal molecules to form organic crystals 214). In some embodiments, CLCs 208 are formed by the cholesteric liquid crystals of solution 206 on alignment layer 204 prior to organic crystal growth (e.g., as described with respect to FIG. 2B). In some embodiments, CLCs 208 are formed by the cholesteric liquid crystals of solution 206 on alignment layer 204 during the organic crystal growth (e.g., formation of CLCs 208 is performed concurrently with the fourth step). In some embodiments, organic crystals 214 are grown using solvent assisted deposition methods known in the art, such as a mold/temperature assisted crystallization process. In such a method, organic molecules may self-assemble in a confined space (e.g., space defined by CLCs 208) during a drying process under a high temperature. In some embodiments, organic crystals 214 are grown from an interface with CLCs 208 (or polymerized CLCs 212), thereby forming organic crystals 214 having hollow helical structures (e.g., organic crystals 214 form helical tubes filled with CLCs 208). In some embodiments, organic crystals 214 at least partially fill a space not occupied by CLCs 208, thereby providing negative helical structures that at least partially surround the helical structures of CLCs 208. CLCs 208 (or optionally polymerized CLCs 212) at least partially surrounded by organic crystals 214 laterally thereby forming optical film 200 corresponding to optical film 100 described above with respect to FIG. 1.

As described above with respect to FIG. 1, in some embodiments, organic crystals 214 have an index of refraction greater than 1.9, greater than 1.95, greater than 2.00, greater than 2.05, greater than 2.10, greater than 2.15, greater than 2.20, greater than 2.25, or greater than 2.30. In some embodiments, CLCs 208 or polymerized CLCs 212 have an index of refraction equal to or lower than 1.9. In some embodiments, CLCs 208 have an index of refraction ranging from 1.5 to 1.9, from 1.6 to 1.9, from 1.7 to 1.9, or from 1.8 to 1.9. In some embodiments, an index of refraction of optical film 200 is at least 1.9. In some embodiments, optical film 200 is selective with respect to handedness, an incident angle, and/or a wavelength range of light incident thereon, as described above with respect to FIG. 1.

Figure 2E:
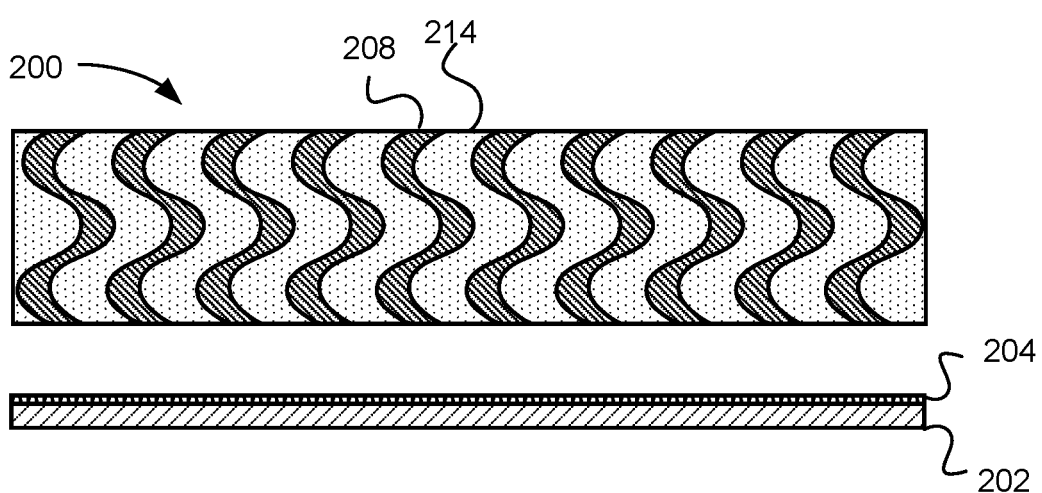

In some embodiments, the method of fabricating optical film 200 further includes removing substrate 202 from optical film 200 including CLCs 208 at least partially surrounded by organic crystal 214, as shown in FIG. 2E. In some embodiments, the method of fabricating optical film 200 also includes removing alignment layer 204 from optical film 200. In some embodiments, removing substrate 202 includes mechanically detaching substrate 202 and optionally alignment layer 204 from optical film 200.

In some embodiments, optical film 100 (or optical film 200) operates as an optical polarizer (e.g., a reflective polarizer or a diffractive polarizer) and is selective with respect to handedness, an incident angle, and/or a wavelength range of light incident thereon, as described above. In some embodiments, optical film 100 operates as a polarization selective lens (e.g., polarization selective lens 300 described below with respect to FIGS. 3A-3D) or a polarization selective grating (e.g., polarization selective grating 400 described below with respect to FIGS. 4A-4D).

FIGS. 3A-3D are schematic diagrams illustrating polarization selective lens 300 in accordance with some embodiments. In some embodiments, polarization selective lens 300 corresponds to optical film 100 or optical film 200 described above with respect to FIGS. 1, 2D, and 2E. Polarization selective lens 300 adds or removes optical power based in part on polarization of incident light. Polarization selective lens 300 is selective with respect to circular polarization of light. When state (handedness) of the circularly polarized light is along a helical axis of an organic crystal, polarization selective lens 300 interacts with the circularly polarized light and thereby changes the direction of the light (e.g., diffracts or reflects the light). Concurrently, while diffracting the light, polarization selective lens 300 also changes the polarization of the light and while reflecting the light, polarization selective lens 300 does not change the polarization of the light. In contrast, polarization selective lens 300 transmits light with opposite circular polarization without changing its direction or polarization. For example, a transmissive polarization selective lens 300 lens changes polarization of RCP light to LCP light and simultaneously focuses or defocuses the reflected light while transmitting LCP light without changing its polarization or direction. As another example, a reflective polarization selective lens 300 lens maintains polarization of reflected RCP light and simultaneously focuses or defocuses the light while transmitting LCP light without changing its polarization or direction. Optical properties of polarization selective lens 300 (e.g., focusing power or diffracting power) are based on variation of azimuthal angles of molecules (e.g., liquid crystal and/or organic crystal molecules). For example, for polarization selective lens 300, azimuthal angle θ of a molecule is determined based on Equation (1):

$$\theta = \left(\frac{r^2}{f} \times \frac{\pi}{\lambda}\right)/2 \tag{1}$$

where r denotes a radial distance between the molecule and an optical center of the lens, f denotes a focal distance, and λ denotes a wavelength of the light that polarization selective lens 300 is designed for (e.g., a reference wavelength or a design wavelength). Thus, in some embodiments, the azimuthal angles of the molecules in the x-y plane increase from the optical center to an edge of the lens. In some embodiments, as expressed by Equation (1), a rate of increase in azimuthal angles between neighboring molecules also increases with the distance from the optical center of the lens. The lens creates a respective lens profile based on the orientations (e.g., azimuth angle θ) of a molecule in the x-y plane. In addition, the optical properties of polarization selective lens 300 are based on a helical axis and/or a helical pitch of helically shaped organic crystals, as described above with respect to FIG. 1.

FIG. 3A illustrates a three dimensional view of polarization selective lens 300 with incoming light 304 entering the lens along the z-axis. FIG. 3B illustrates an x-y plane view of polarization selective lens 300 with a plurality of helically shaped organic crystals (e.g., organic crystals 302-1 and 302-2) with various orientations. The orientations (e.g., azimuthal angle θ) of the organic crystals vary along reference line between A and A' from the center of polarization selective lens 300 toward the periphery of polarization selective lens 300. FIG. 3C illustrates an x-z-cross-sectional view of polarization selective lens 300. As shown in FIG. 3C, the organic crystals (e.g., organic crystals 302-1 and 302-2 in FIG. 4B) of polarization selective lens 300 are arranged in helical structures 308. Helical structures 308 have helical axes aligned corresponding to the z-axis. As the azimuthal angle of respective organic crystals on the x-y-plane varies, the helical structures create a volume grating with a plurality of diffraction planes (e.g., planes 310-1 and 310-2) forming cycloidal patterns. The diffraction planes (e.g., Bragg diffraction planes) defined in a volume of polarization selective lens 300 produce a periodically changing refractive index. Helical structures 308 define the polarization selectivity of polarization selective lens 300, as light with circular polarization handedness corresponding to the helical axis is diffracted while light with circular polarization with the opposite handedness is not diffracted. Helical structures 308 also define the wavelength selectivity of polarization selective lens 300, as was described above with respect to FIG. 1. Light with wavelength close to a helical pitch (e.g., helical pitch 312 in FIG. 3C) is diffracted while light with other wavelengths is not diffracted. A helical pitch refers to a distance when a helix has made a 360 degree turn along a helical axis (e.g., the z-axis in FIG. 3C). FIG. 3D illustrates a detailed plane view of the molecules along the reference line between A and A' in FIG. 3B. Pitch 306 is defined as a distance along x-axis at which the azimuth angle of a helically shaped organic crystal has rotated 360 degrees from the initial orientation. In some embodiments, pitch 306 varies as a function of distance from the center of polarization selective lens 300. In case of a lens, the azimuthal angle of molecules varies in accordance with Equation (1) shown above. In such cases, the pitch at the center of the lens is the longest and the pitch at the edge of the lens is the shortest.

Figure 4A:
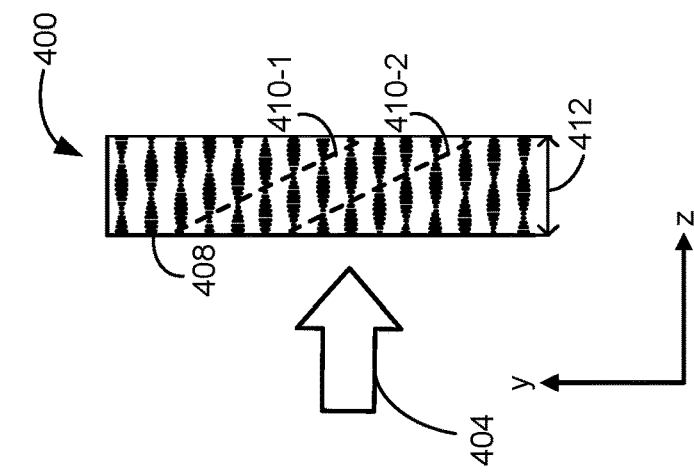
FIGS. 4A-4D are schematic diagrams illustrating a polarization selective grating in accordance with some embodiments.
Figure 4B:
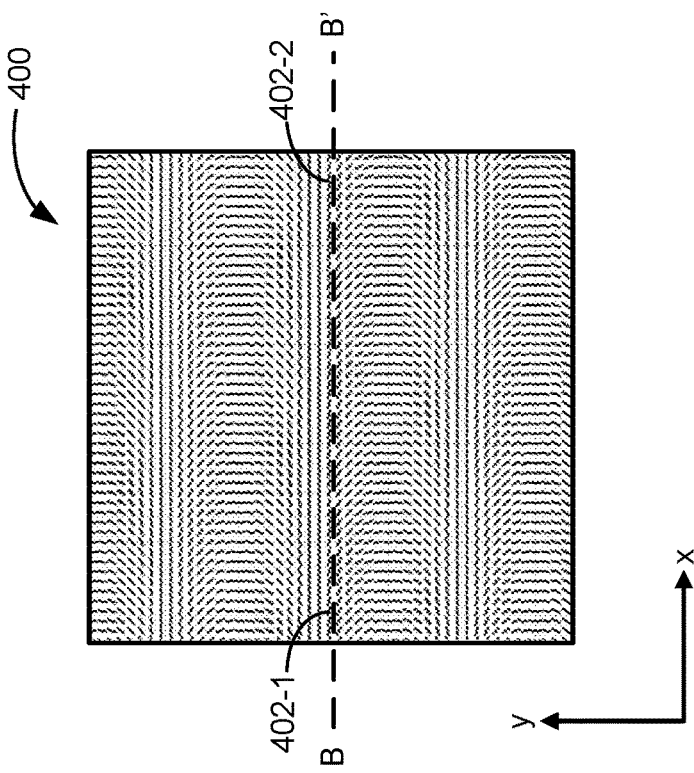
Figure 4C:
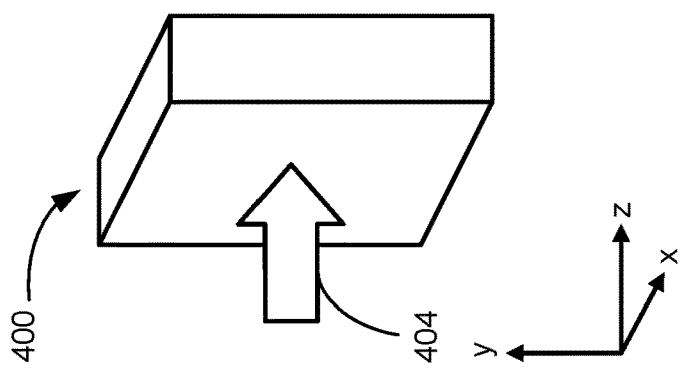
Figure 4D:

FIGS. 4A-4D are schematic diagrams illustrating polarization selective grating 400 in accordance with some embodiments. FIG. 4A illustrates a three dimensional view of polarization selective grating 400 with incoming light 404 entering the lens along the z-axis. FIG. 4B illustrates an x-y-plane view of polarization selective grating 400 with a plurality of organic crystals (e.g., organic crystals 402-1 and 402-2) with various orientations. In contrast to polarization selective lens 300 described above with respect to FIG. 3B, the orientations (e.g., azimuthal angles θ) of the organic crystals are constant along reference line between B and B' along the x-axis, as shown in FIG. 4D illustrating a detailed plane view of the organic crystals along the reference line. The orientations of the organic crystals in FIG. 4B vary along the y-axis. In case of a grating, the pitch defined as a distance along the y-axis at which the azimuth angle of an organic crystal has rotated 360 degrees may be constant throughout the grating. FIG. 4C illustrates a y-z-cross-sectional view of polarization selective grating 400. Polarization selective grating 400 has helical structures 408 with helical axes aligned corresponding to the z-axis. The helical structures create a volume grating with a plurality of diffraction planes (e.g., planes 410-1 and 410-2). In FIG. 4C, diffraction planes 410-1 and 410-2 are tilted with respect to the z-axis. As explained above with respect FIG. 3C, helical structures 408 define the polarization selectivity of polarization selective grating 400, as light with circular polarization handedness corresponding to the helical axes is diffracted while light with circular polarization with the opposite handedness is not diffracted. Helical structures 408 also define the wavelength selectivity of polarization selective grating 400, as light with wavelength close to a helical pitch (e.g., helical pitch 412 in FIG. 4C) is diffracted while light with other wavelengths is not diffracted.

In some embodiments, optical film 100 (or optical film 200) may be used in display devices such as head-mounted display devices. In some embodiments, optical film 100 may be implemented as multifunctional optical components in near-eye displays for augmented reality ("AR"), virtual reality ("VR"), and/or mixed reality ("MR"). For example, the disclosed optical elements or devices may be implemented as waveguide-based combiners, eye-tracking components, display resolution enhancement components, pupil steering elements, and polarization controlling components (e.g., a quarter-wave plate or a half-wave plate), etc., which may significantly reduce the weight and size, and enhance the optical performance of the head-mounted display devices. Exemplary embodiments of head-mounted display devices for implementing optical film 100 are described with respect to FIGS. 5-7.

Figure 5:
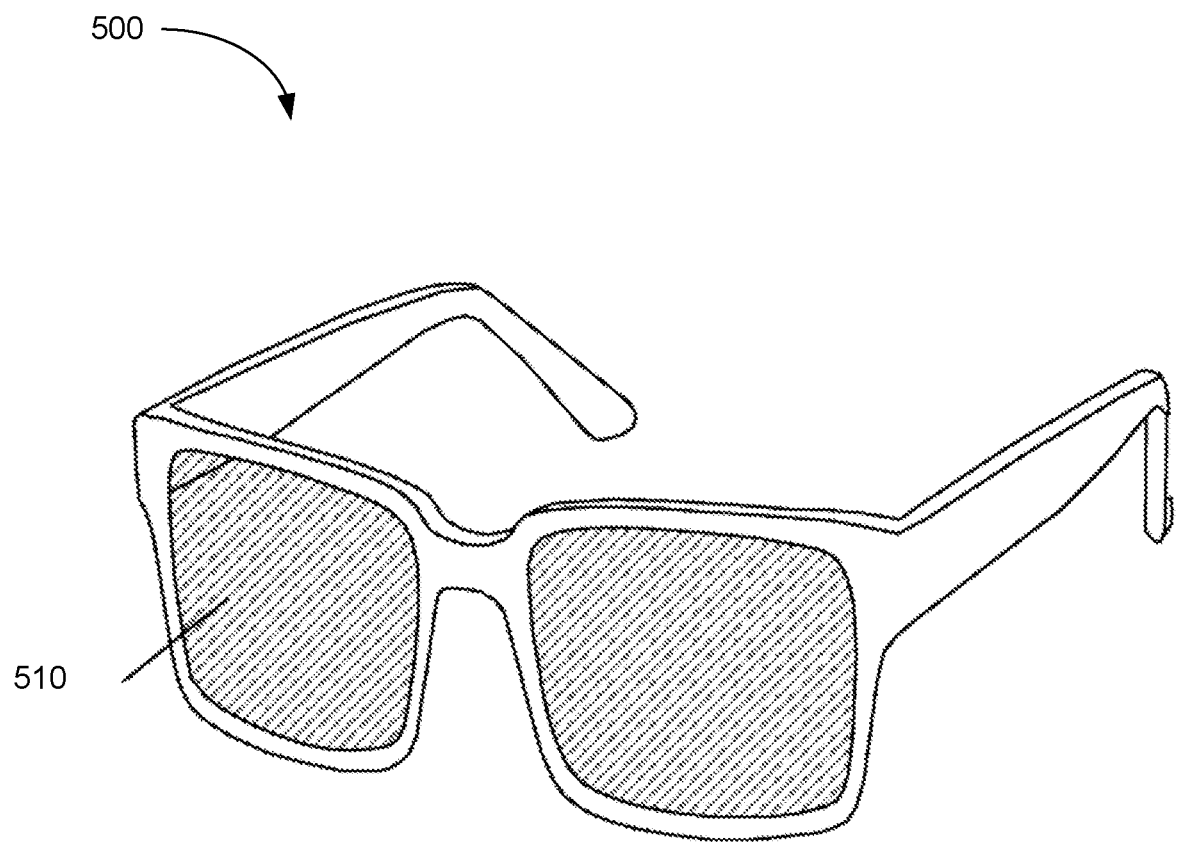
FIG. 5 is a perspective view of a display device in accordance with some embodiments.

FIG. 5 illustrates display device 500 in accordance with some embodiments. In some embodiments, display device 500 is configured to be worn on a head of a user (e.g., by having the form of spectacles or eyeglasses, as shown in FIG. 5) or to be included as part of a helmet that is to be worn by the user. When display device 500 is configured to be worn on a head of a user or to be included as part of a helmet, display device 500 is called a head-mounted display. Alternatively, display device 500 is configured for placement in proximity of an eye or eyes of the user at a fixed location, without being head-mounted (e.g., display device 500 is mounted in a vehicle, such as a car or an airplane, for placement in front of an eye or eyes of the user). As shown in FIG. 5, display device 500 includes display 510. Display 510 is configured for presenting visual contents (e.g., augmented reality contents, virtual reality contents, mixed reality contents, or any combination thereof) to a user.

Figure 6:
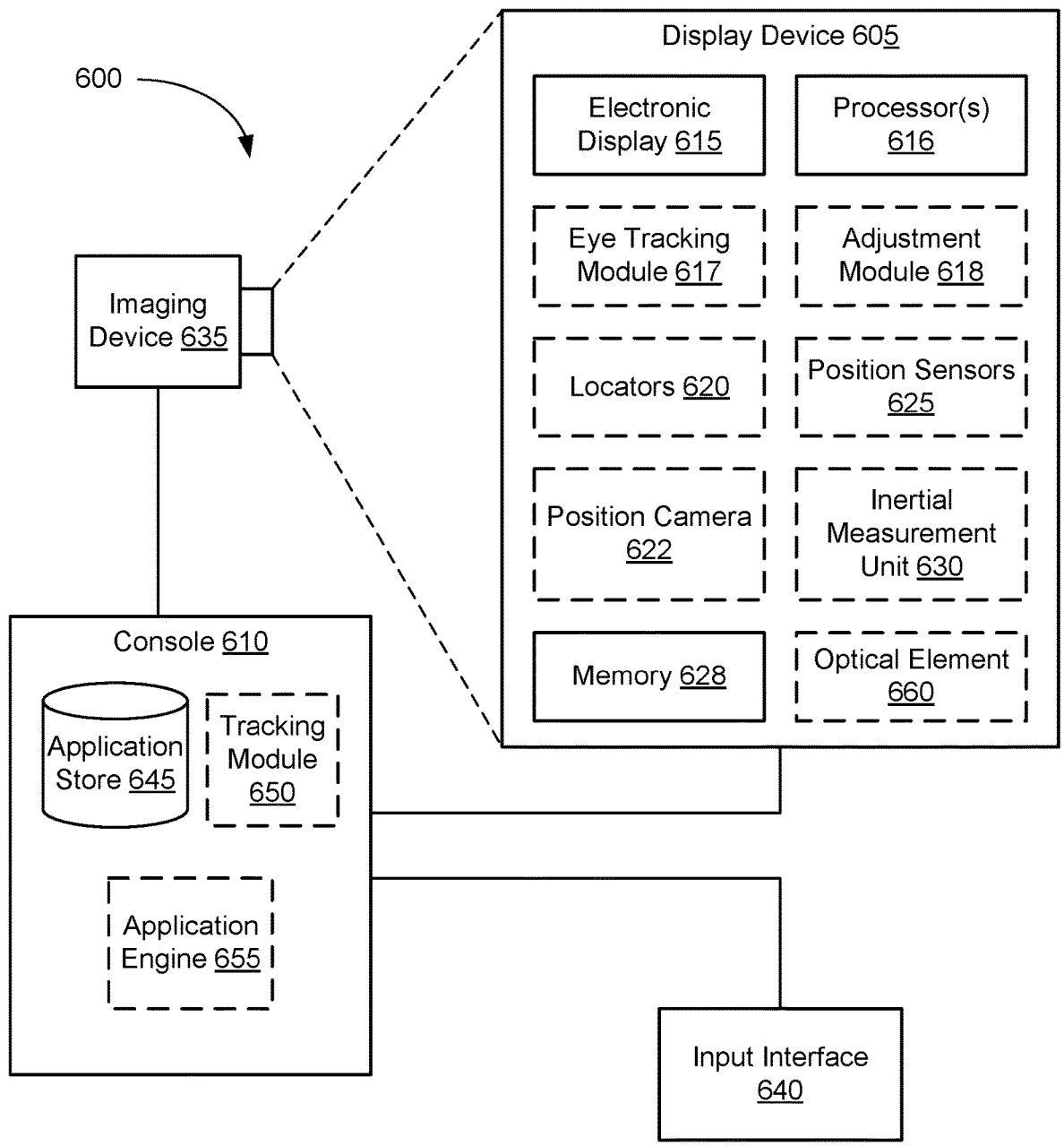
FIG. 6 is a block diagram of a system including a display device in accordance with some embodiments.

In some embodiments, display device 500 includes one or more components described herein with respect to FIG. 6. In some embodiments, display device 500 includes additional components not shown in FIG. 6.

FIG. 6 is a block diagram of system 600 in accordance with some embodiments. The system 600 shown in FIG. 6 includes display device 605 (which corresponds to display device 500 shown in FIG. 5), imaging device 635, and input interface 640 that are each coupled to console 610. While FIG. 6 shows an example of system 600 including one display device 605, imaging device 635, and input interface 640, in other embodiments, any number of these components may be included in system 600. For example, there may be multiple display devices 605 each having associated input interface 640 and being monitored by one or more imaging devices 635, with each display device 605, input interface 640, and imaging devices 635 communicating with console 610. In alternative configurations, different and/or additional components may be included in system 600. For example, in some embodiments, console 610 is connected via a network (e.g., the Internet or a wireless network) to system 600 or is self-contained as part of display device 605 (e.g., physically located inside display device 605). In some embodiments, display device 605 is used to create mixed reality by adding in a view of the real surroundings. Thus, display device 605 and system 600 described here can deliver augmented reality, virtual reality, and mixed reality.

In some embodiments, as shown in FIG. 5, display device 605 is a head-mounted display that presents media to a user. Examples of media presented by display device 605 include one or more images, video, audio, or some combination thereof. In some embodiments, audio is presented via an external device (e.g., speakers and/or headphones) that receives audio information from display device 605, console 610, or both, and presents audio data based on the audio information. In some embodiments, display device 605 immerses a user in an augmented environment.

In some embodiments, display device 605 also acts as an augmented reality (AR) headset. In these embodiments, display device 605 augments views of a physical, real-world environment with computer-generated elements (e.g., images, video, sound, etc.). Moreover, in some embodiments, display device 605 is able to cycle between different types of operation. Thus, display device 605 operate as a virtual reality (VR) device, an augmented reality (AR) device, as glasses or some combination thereof (e.g., glasses with no optical correction, glasses optically corrected for the user, sunglasses, or some combination thereof) based on instructions from application engine 655.

Display device 605 includes electronic display 615, one or more processors 616, eye tracking module 617, adjustment module 618, one or more locators 620, one or more position sensors 625, one or more position cameras 622, memory 628, inertial measurement unit (IMU) 630, one or more optical elements 660 or a subset or superset thereof (e.g., display device 605 with electronic display 615, one or more processors 616, and memory 628, without any other listed components). Some embodiments of display device 605 have different modules than those described here. Similarly, the functions can be distributed among the modules in a different manner than is described here.

One or more processors 616 (e.g., processing units or cores) execute instructions stored in memory 628. Memory 628 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 628, or alternately the non-volatile memory device(s) within memory 628, includes a non-transitory computer readable storage medium. In some embodiments, memory 628 or the computer readable storage medium of memory 628 stores programs, modules and data structures, and/or instructions for displaying one or more images on electronic display 615.

Electronic display 615 displays images to the user in accordance with data received from console 610 and/or processor(s) 616. In various embodiments, electronic display 615 may comprise a single adjustable display element or multiple adjustable display elements (e.g., a display for each eye of a user). In some embodiments, electronic display 615 is configured to display images to the user by projecting the images onto one or more optical elements 660.

In some embodiments, the display element includes one or more light emission devices and a corresponding array of spatial light modulators. A spatial light modulator is an array of electro-optic pixels, opto-electronic pixels, some other array of devices that dynamically adjust the amount of light transmitted by each device, or some combination thereof. These pixels are placed behind one or more lenses. In some embodiments, the spatial light modulator is an array of liquid crystal based pixels in an LCD (a Liquid Crystal Display). Examples of the light emission devices include: an organic light emitting diode, an active-matrix organic light-emitting diode, a light emitting diode, some type of device capable of being placed in a flexible display, or some combination thereof. The light emission devices include devices that are capable of generating visible light (e.g., red, green, blue, etc.) used for image generation. The spatial light modulator is configured to selectively attenuate individual light emission devices, groups of light emission devices, or some combination thereof. Alternatively, when the light emission devices are configured to selectively attenuate individual emission devices and/or groups of light emission devices, the display element includes an array of such light emission devices without a separate emission intensity array. In some embodiments, electronic display 615 projects images to one or more optical elements 660, which reflect at least a portion of the light toward an eye of a user.

One or more lenses direct light from the arrays of light emission devices (optionally through the emission intensity arrays) to locations within each eyebox and ultimately to the back of the user's retina(s). An eyebox is a region that is occupied by an eye of a user located proximity to display device 605 (e.g., a user wearing display device 605) for viewing images from display device 605. In some cases, the eyebox is represented as a 10 mm×10 mm square. In some embodiments, the one or more lenses include one or more coatings, such as anti-reflective coatings.

In some embodiments, the display element includes an infrared (IR) detector array that detects IR light that is retro-reflected from the retinas of a viewing user, from the surface of the corneas, lenses of the eyes, or some combination thereof. The IR detector array includes an IR sensor or a plurality of IR sensors that each correspond to a different position of a pupil of the viewing user's eye. In alternate embodiments, other eye tracking systems may also be employed. As used herein, IR refers to light with wavelengths ranging from 700 nm to 1 mm including near infrared (NIR) ranging from 750 nm to 1500 nm.

Eye tracking module 617 determines locations of each pupil of a user's eyes. In some embodiments, eye tracking module 617 instructs electronic display 615 to illuminate the eyebox with IR light (e.g., via IR emission devices in the display element).

A portion of the emitted IR light will pass through the viewing user's pupil and be retro-reflected from the retina toward the IR detector array, which is used for determining the location of the pupil. Alternatively, the reflection off of the surfaces of the eye is used to also determine location of the pupil. The IR detector array scans for retro-reflection and identifies which IR emission devices are active when retro-reflection is detected. Eye tracking module 617 may use a tracking lookup table and the identified IR emission devices to determine the pupil locations for each eye. The tracking lookup table maps received signals on the IR detector array to locations (corresponding to pupil locations) in each eyebox. In some embodiments, the tracking lookup table is generated via a calibration procedure (e.g., user looks at various known reference points in an image and eye tracking module 617 maps the locations of the user's pupil while looking at the reference points to corresponding signals received on the IR tracking array). As mentioned above, in some embodiments, system 600 may use other eye tracking systems than the embedded IR one described herein.

Adjustment module 618 generates an image frame based on the determined locations of the pupils. In some embodiments, this sends a discrete image to the display that will tile subimages together thus a coherent stitched image will appear on the back of the retina. Adjustment module 618 adjusts an output (i.e. the generated image frame) of electronic display 615 based on the detected locations of the pupils. Adjustment module 618 instructs portions of electronic display 615 to pass image light to the determined locations of the pupils. In some embodiments, adjustment module 618 also instructs the electronic display to not pass image light to positions other than the determined locations of the pupils. Adjustment module 618 may, for example, block and/or stop light emission devices whose image light falls outside of the determined pupil locations, allow other light emission devices to emit image light that falls within the determined pupil locations, translate and/or rotate one or more display elements, dynamically adjust curvature and/or refractive power of one or more active lenses in the lens (e.g., microlens) arrays, or some combination thereof.

Optional locators 620 are objects located in specific positions on display device 605 relative to one another and relative to a specific reference point on display device 605. A locator 620 may be a light emitting diode (LED), a corner cube reflector, a reflective marker, a type of light source that contrasts with an environment in which display device 605 operates, or some combination thereof. In embodiments where locators 620 are active (e.g., an LED or other type of light emitting device), locators 620 may emit light in the visible band (e.g., about 500 nm to 750 nm), in the infrared band (e.g., about 750 nm to 1 mm), in the ultraviolet band (about 100 nm to 500 nm), some other portion of the electromagnetic spectrum, or some combination thereof.

In some embodiments, locators 620 are located beneath an outer surface of display device 605, which is transparent to the wavelengths of light emitted or reflected by locators 620 or is thin enough to not substantially attenuate the wavelengths of light emitted or reflected by locators 620. Additionally, in some embodiments, the outer surface or other portions of display device 605 are opaque in the visible band of wavelengths of light. Thus, locators 620 may emit light in the IR band under an outer surface that is transparent in the IR band but opaque in the visible band.

IMU 630 is an electronic device that generates calibration data based on measurement signals received from one or more position sensors 625. Position sensor 625 generates one or more measurement signals in response to motion of display device 605. Examples of position sensors 625 include: one or more accelerometers, one or more gyroscopes, one or more magnetometers, another suitable type of sensor that detects motion, a type of sensor used for error correction of IMU 630, or some combination thereof. Position sensors 625 may be located external to IMU 630, internal to IMU 630, or some combination thereof.

Based on the one or more measurement signals from one or more position sensors 625, IMU 630 generates first calibration data indicating an estimated position of display device 605 relative to an initial position of display device 605. For example, position sensors 625 include multiple accelerometers to measure translational motion (forward/back, up/down, left/right) and multiple gyroscopes to measure rotational motion (e.g., pitch, yaw, roll). In some embodiments, IMU 630 rapidly samples the measurement signals and calculates the estimated position of display device 605 from the sampled data. For example, IMU 630 integrates the measurement signals received from the accelerometers over time to estimate a velocity vector and integrates the velocity vector over time to determine an estimated position of a reference point on display device 605. Alternatively, IMU 630 provides the sampled measurement signals to console 610, which determines the first calibration data. The reference point is a point that may be used to describe the position of display device 605. While the reference point may generally be defined as a point in space; however, in practice the reference point is defined as a point within display device 605 (e.g., a center of IMU 630).

In some embodiments, IMU 630 receives one or more calibration parameters from console 610. As further discussed below, the one or more calibration parameters are used to maintain tracking of display device 605. Based on a received calibration parameter, IMU 630 may adjust one or more IMU parameters (e.g., sample rate). In some embodiments, certain calibration parameters cause IMU 630 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

Imaging device 635 generates calibration data in accordance with calibration parameters received from console 610. Calibration data includes one or more images showing observed positions of locators 620 that are detectable by imaging device 635. In some embodiments, imaging device 635 includes one or more still cameras, one or more video cameras, any other device capable of capturing images including one or more locators 620, or some combination thereof. Additionally, imaging device 635 may include one or more filters (e.g., used to increase signal to noise ratio). Imaging device 635 is configured to optionally detect light emitted or reflected from locators 620 in a field of view of imaging device 635. In embodiments where locators 620 include passive elements (e.g., a retroreflector), imaging device 635 may include a light source that illuminates some or all of locators 620, which retro-reflect the light towards the light source in imaging device 635. Second calibration data is communicated from imaging device 635 to console 610, and imaging device 635 receives one or more calibration parameters from console 610 to adjust one or more imaging parameters (e.g., focal length, focus, frame rate, ISO, sensor temperature, shutter speed, aperture, etc.).

In some embodiments, display device 605 optionally includes one or more optical elements 660 (e.g., lenses, reflectors, gratings, etc.). In some embodiments, electronic display device 605 includes a single optical element 660 or multiple optical elements 660 (e.g., an optical element 660 for each eye of a user). In some embodiments, electronic display 615 projects computer-generated images on one or more optical elements 660, such as a reflective element, which, in turn, reflect the images toward an eye or eyes of a user. The computer-generated images include still images, animated images, and/or a combination thereof. The computer-generated images include objects that appear to be two-dimensional and/or three-dimensional objects. In some embodiments, one or more optical elements 660 are partially transparent (e.g., the one or more optical elements 660 have a transmittance of at least 15%, 20%, 25%, 30%, 35%, 50%, 55%, or 50%), which allows transmission of ambient light. In such embodiments, computer-generated images projected by electronic display 615 are superimposed with the transmitted ambient light (e.g., transmitted ambient image) to provide augmented reality images. In some embodiments, optical elements 660 include optical film 100 or 200 described with respect to FIGS. 1 and 2D-2E.

Input interface 640 is a device that allows a user to send action requests to console 610. An action request is a request to perform a particular action. For example, an action request may be to start or end an application or to perform a particular action within the application. Input interface 640 may include one or more input devices. Example input devices include: a keyboard, a mouse, a game controller, data from brain signals, data from other parts of the human body, or any other suitable device for receiving action requests and communicating the received action requests to console 610. An action request received by input interface 640 is communicated to console 610, which performs an action corresponding to the action request. In some embodiments, input interface 640 may provide haptic feedback to the user in accordance with instructions received from console 610. For example, haptic feedback is provided when an action request is received, or console 610 communicates instructions to input interface 640 causing input interface 640 to generate haptic feedback when console 610 performs an action.

Console 610 provides media to display device 605 for presentation to the user in accordance with information received from one or more of: imaging device 635, display device 605, and input interface 640. In the example shown in FIG. 6, console 610 includes application store 645, tracking module 650, and application engine 655. Some embodiments of console 610 have different modules than those described in conjunction with FIG. 6. Similarly, the functions further described herein may be distributed among components of console 610 in a different manner than is described here.

When application store 645 is included in console 610, application store 645 stores one or more applications for execution by console 610. An application is a group of instructions, that when executed by a processor, is used for generating content for presentation to the user. Content generated by the processor based on an application may be in response to inputs received from the user via movement of display device 605 or input interface 640. Examples of applications include: gaming applications, conferencing applications, video playback application, or other suitable applications.

When tracking module 650 is included in console 610, tracking module 650 calibrates system 600 using one or more calibration parameters and may adjust one or more calibration parameters to reduce error in determination of the position of display device 605. For example, tracking module 650 adjusts the focus of imaging device 635 to obtain a more accurate position for observed locators on display device 605. Moreover, calibration performed by tracking module 650 also accounts for information received from IMU 630. Additionally, if tracking of display device 605 is lost (e.g., imaging device 635 loses line of sight of at least a threshold number of locators 620), tracking module 650 re-calibrates some or all of system 600.

In some embodiments, tracking module 650 tracks movements of display device 605 using second calibration data from imaging device 635. For example, tracking module 650 determines positions of a reference point of display device 605 using observed locators from the second calibration data and a model of display device 605. In some embodiments, tracking module 650 also determines positions of a reference point of display device 605 using position information from the first calibration data. Additionally, in some embodiments, tracking module 650 may use portions of the first calibration data, the second calibration data, or some combination thereof, to predict a future location of display device 605. Tracking module 650 provides the estimated or predicted future position of display device 605 to application engine 655.

Application engine 655 executes applications within system 600 and receives position information, acceleration information, velocity information, predicted future positions, or some combination thereof of display device 605 from tracking module 650. Based on the received information, application engine 655 determines content to provide to display device 605 for presentation to the user. For example, if the received information indicates that the user has looked to the left, application engine 655 generates content for display device 605 that mirrors the user's movement in an augmented environment. Additionally, application engine 655 performs an action within an application executing on console 610 in response to an action request received from input interface 640 and provides feedback to the user that the action was performed. The provided feedback may be visual or audible feedback via display device 605 or haptic feedback via input interface 640.

Figure 7:
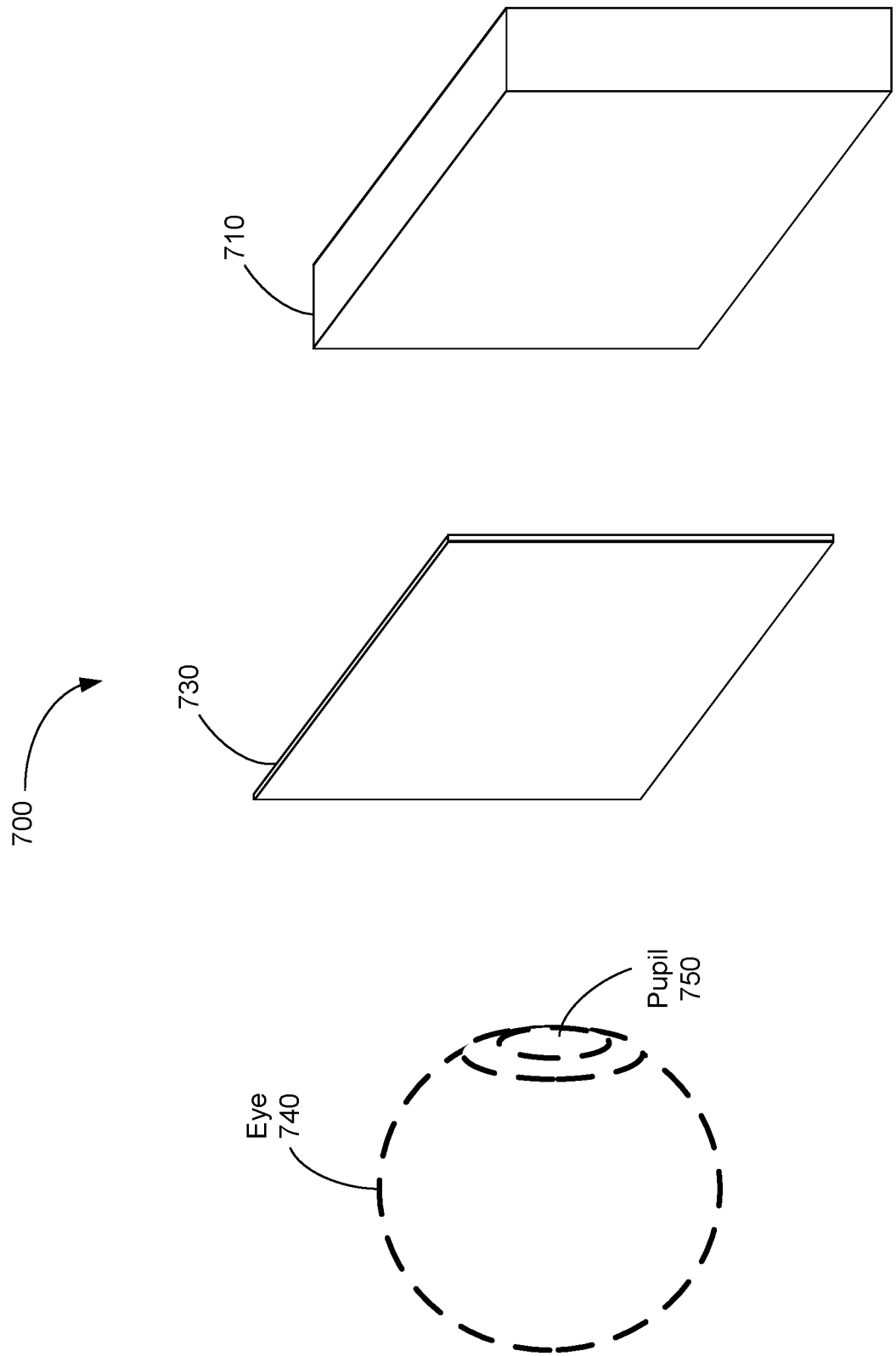
FIG. 7 is an isometric view of a display device in accordance with some embodiments.

FIG. 7 is an isometric view of display device 700 in accordance with some embodiments. In some other embodiments, display device 700 is part of some other electronic display (e.g., a digital microscope, a head-mounted display device, etc.). In some embodiments, display device 700 includes light emission device 710 (e.g., a light emission device array) and an optical assembly 730, which may include one or more lenses and/or other optical components. In some embodiments, optical assembly 730 includes one or more optical films 200 (e.g., one or more polarization selective lenses 300 or one or more polarization selective gratings 400). In some embodiments, display device 700 also includes an IR detector array.

Light emission device 710 emits image light and optional IR light toward the viewing user. Light emission device 710 includes one or more light emission components that emit light in the visible light (and optionally includes components that emit light in the IR). Light emission device 710 may include, e.g., an array of LEDs, an array of microLEDs, an array of organic LEDs (OLEDs), an array of superluminescent LEDs (sLEDS) or some combination thereof.

In some embodiments, light emission device 710 includes an emission intensity array (e.g., a spatial light modulator) configured to selectively attenuate light emitted from light emission device 710. In some embodiments, the emission intensity array is composed of a plurality of liquid crystal cells or pixels, groups of light emission devices, or some combination thereof. Each of the liquid crystal cells is, or in some embodiments, groups of liquid crystal cells are, addressable to have specific levels of attenuation. For example, at a given time, some of the liquid crystal cells may be set to no attenuation, while other liquid crystal cells may be set to maximum attenuation. In this manner, the emission intensity array is able to provide image light and/or control what portion of the image light is passed to the optical assembly 730. In some embodiments, display device 700 uses the emission intensity array to facilitate providing image light to a location of pupil 750 of eye 740 of a user, and minimize the amount of image light provided to other areas in the eyebox. In some embodiments, display device 700 includes, or is optically coupled with, optical film 100 operating as a display resolution enhancement component. In some embodiments, display device 700 is an augmented reality display device. In such embodiments, display device 700 includes, or is optically coupled with, optical film 100 operating as a waveguide-based combiner or as a polarization selective reflector.

The optical assembly 730 includes one or more lenses. The one or more lenses in optical assembly 730 receive modified image light (e.g., attenuated light) from light emission device 710, and direct the modified image light to a location of pupil 750. The optical assembly 730 may include additional optical components, such as color filters, mirrors, etc. In some embodiments, optical assembly 730 includes optical film 100 or 200 described with respect to FIGS. 1 and 2D-2E.

An optional IR detector array detects IR light that has been retro-reflected from the retina of eye 740, a cornea of eye 740, a crystalline lens of eye 740, or some combination thereof. The IR detector array includes either a single IR sensor or a plurality of IR sensitive detectors (e.g., photodiodes). In some embodiments, the IR detector array is separate from light emission device 710. In some embodiments, the IR detector array is integrated into light emission device 710.

In some embodiments, light emission device 710 including an emission intensity array make up a display element. Alternatively, the display element includes light emission device 710 (e.g., when light emission device 710 includes individually adjustable pixels) without the emission intensity array. In some embodiments, the display element additionally includes the IR array. In some embodiments, in response to a determined location of pupil 750, the display element adjusts the emitted image light such that the light output by the display element is refracted by one or more lenses toward the determined location of pupil 750, and not toward other locations in the eyebox.

In some embodiments, display device 700 includes one or more broadband sources (e.g., one or more white LEDs) coupled with a plurality of color filters, in addition to, or instead of, light emission device 710.

In light of these principles, we now turn to certain embodiments.

In accordance with some embodiments, an optical film includes a plurality of helically arranged liquid crystals and organic solid crystal structures at least partially surrounding the plurality of helically arranged liquid crystals. For example, optical film 100 incudes helically shaped CLCs 102 and organic crystals 104 in FIG. 1.

In some embodiments, the organic solid crystal structures (e.g., organic crystals 104 in FIG. 1) conform to shapes of the plurality of helically arranged liquid crystals (e.g., CLCs 102).

In some embodiments, the organic solid crystal structures define a plurality of helically shaped cavities, in which the plurality of helically arranged liquid crystals is located (e.g., organic crystals 104 define helical tubes filled with CLCs 102).

In some embodiments, an index of refraction of the optical film (e.g., optical film 100) is at least 1.9.

In some embodiments, the organic solid crystal structures include one or more polycyclic aromatic hydrocarbons selected from a group consisting of naphthalene, anthracene, tetracene, pentacene, pyrene, polycene, fluoranthene, benzophenone, benzochromene, benzil, benzimidazole, benzene, hexachlorobenzene, nitropyridine-N-oxide, benzene-1,4-dicarboxylic acid, diphenylacetylene, N-(4-nitrophenyl)-(s)-prolinal, 4,5-dicyanoimidazole, benzodithiophene, cyanopyridine, thienothiophene, stilbene, azobenzene, and their derivatives.

In some embodiments, the plurality of helically shaped organic solid crystals includes one or more organic ring structures that include (i) one or more saturated cyclic compounds selected from a group consisting of cyclohexane, cyclopentane, tetrahydropyran, piperidine, tetrahydrofuran, pyrrolidine, tetrahydrothiophene and their derivatives and (ii) one or more unsaturated aromatic compounds selected from a group consisting of benzene, naphthalene, anthracene, thiophene, bi-phenyl, tolane, benzimidazole, diphenylacetylene, cyanopyridine, thienothiophene, dibenzothiophene, carbazole, silafluorene and their derivatives.

In some embodiments, the one or more organic ring structures are coupled with one or more terminal groups selected from the group consisting of $C_1$-$C_{10}$ alkyl, alkenyl, —CN, —NCS, —SCN, —SF$_5$, —Br, —Cl, —F, —OCF$_3$, —CF$_3$, mono- or polyfluorinated $C_1$-$C_{10}$ alkyl, and alkoxy.

In some embodiments, the plurality of helically arranged liquid crystals includes one or more liquid crystals selected from the group consisting of:

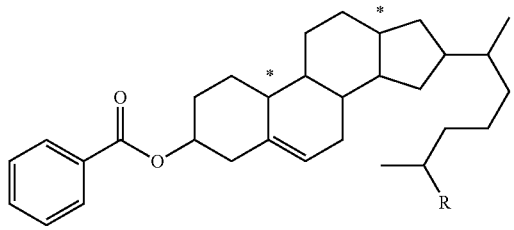

Formula 1-001

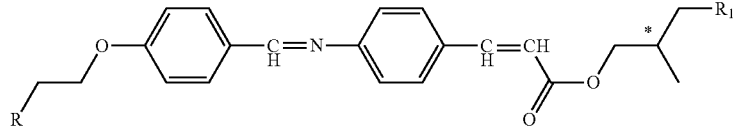

Formula 1-002

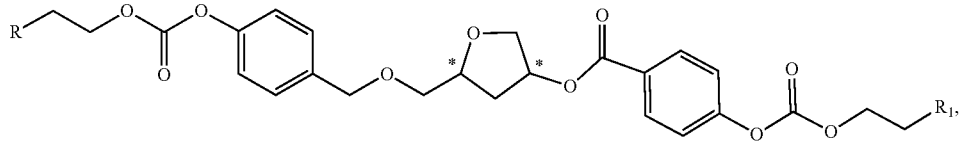

Formula 1-003, where R is either H or $(CH_2)_{n1}CH_2X_1$ and $R_1$ is either H or $(CH_2)_{n2}CH_2X_1$, $X_1$ is acrylate, methacrylate, vinyl acrylate, or H, and $n_1$ and $n_2$ range from zero to eight. An asterisk (*) indicates a chiral center of a formula.

In some embodiments, the plurality of helically arranged liquid crystals includes one or more liquid crystals selected from the group consisting of:

Formula 2-001
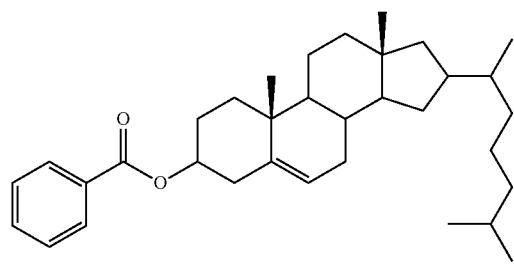
Formula 2-002
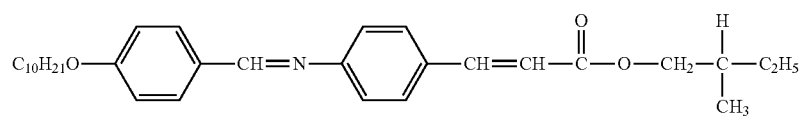
Formula 2-003
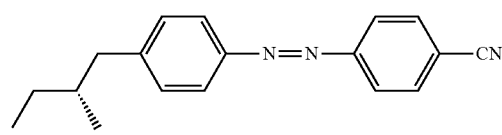
Formula 2-004
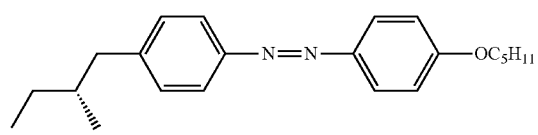
Formula 2-005
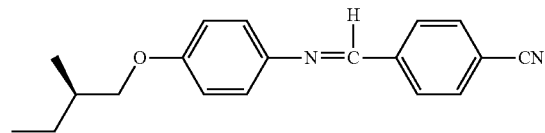
Formula 2-006
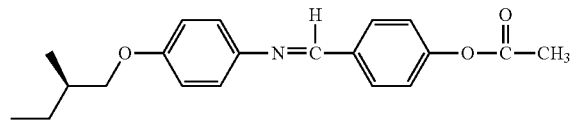
Formula 2-007
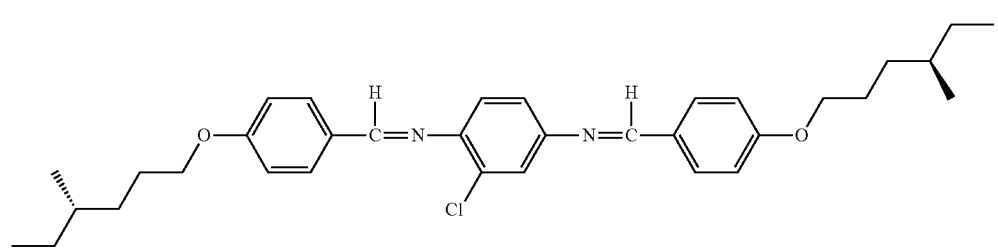
Formula 2-008
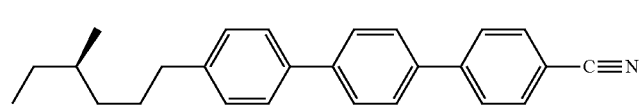
Formula 2-009
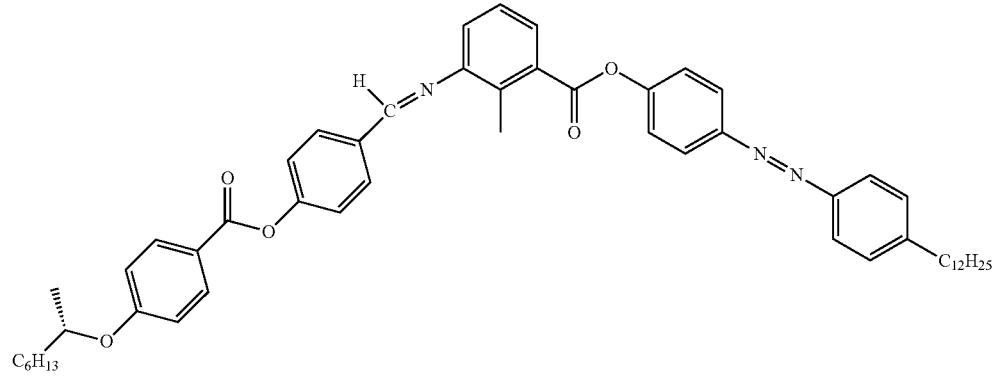
Formula 2-010
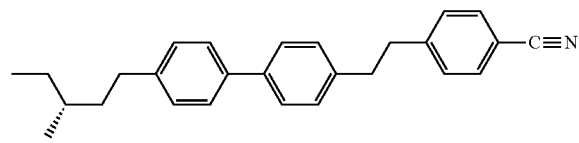
Formula 2-011
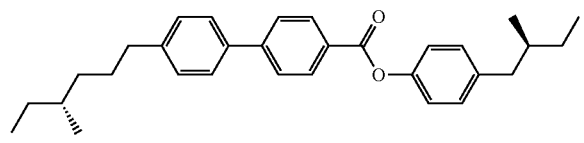

-continued
Formula 2-012
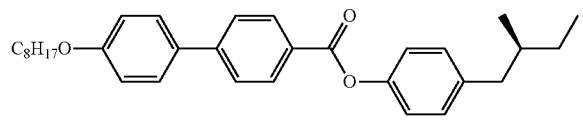
Formula 2-013
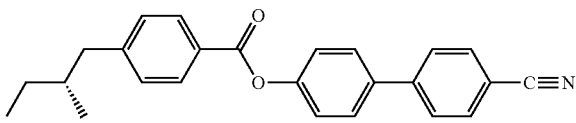
Formula 2-014
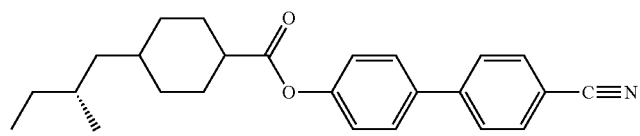
Formula 2-015
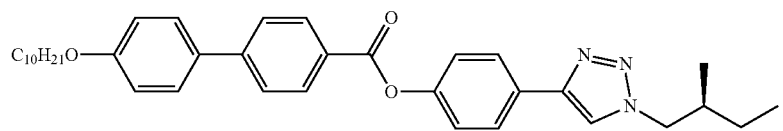
Formula 2-016
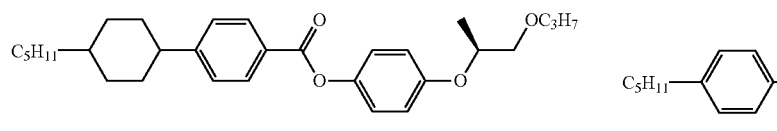
Formula 2-017
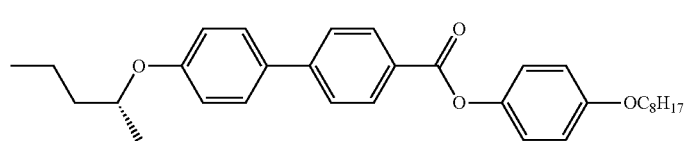
Formula 2-018
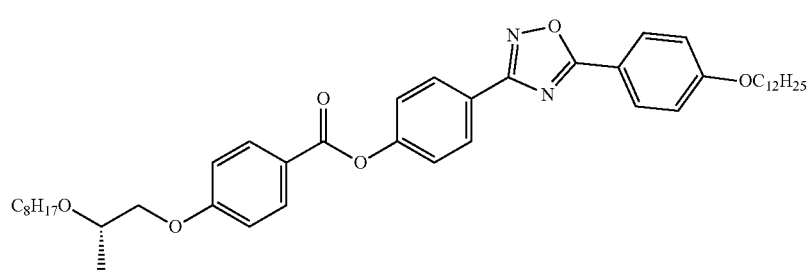
Formula 2-019
Formula 2-020
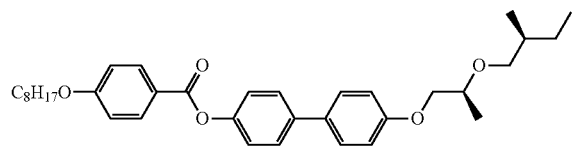
Formula 2-021
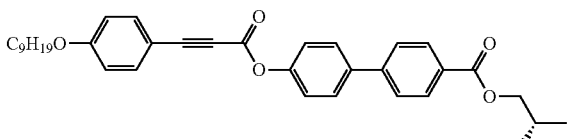
Formula 2-022
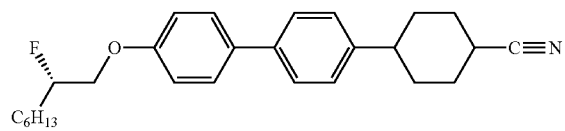
Formula 2-023
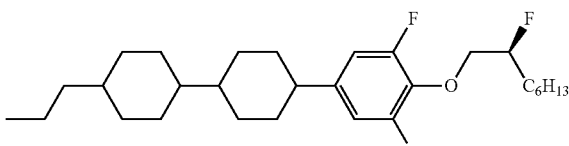
Formula 2-024
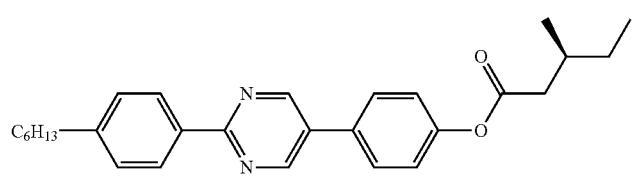

-continued
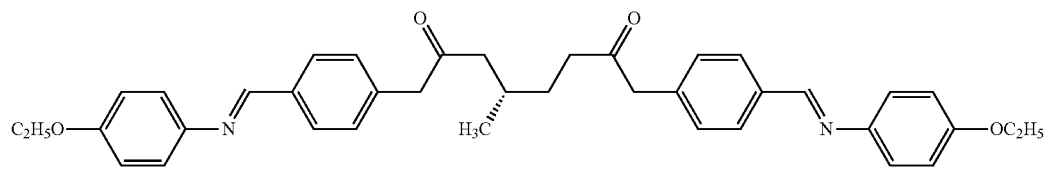
Formula 2-025
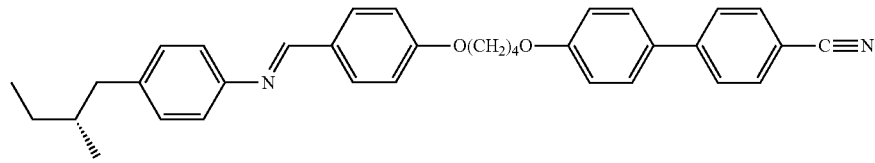
Formula 2-026
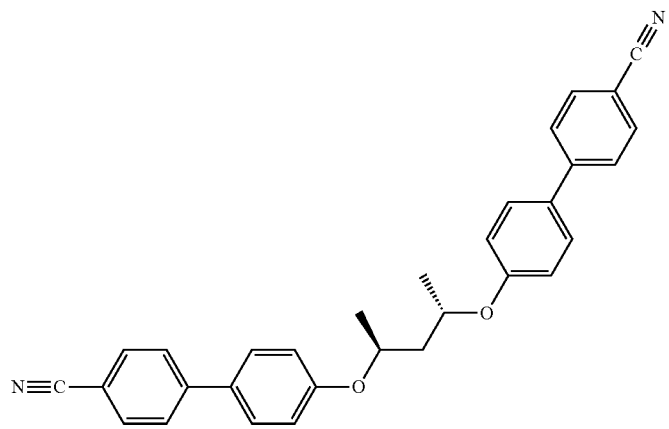
Formula 2-027
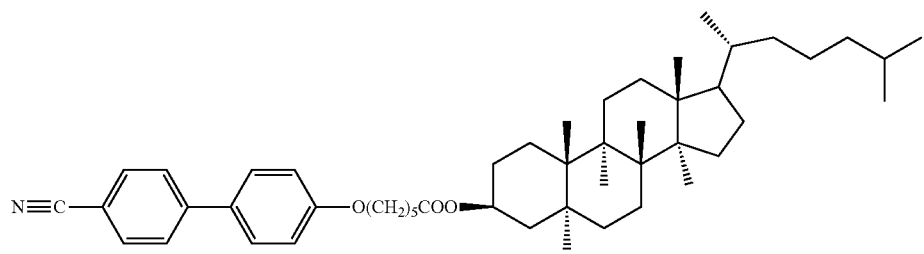
Formula 2-028
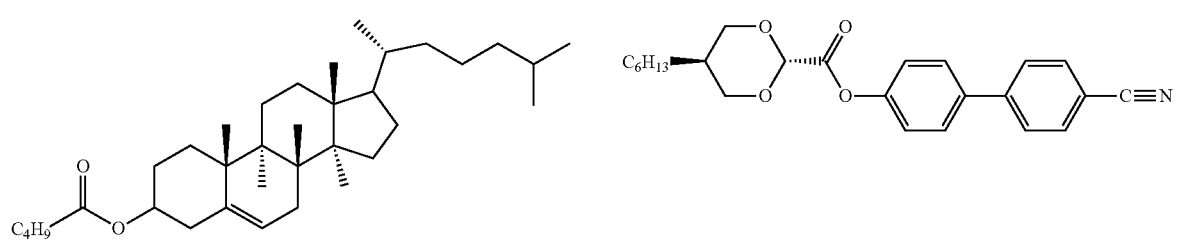
Formula 2-029
Formula 2-030
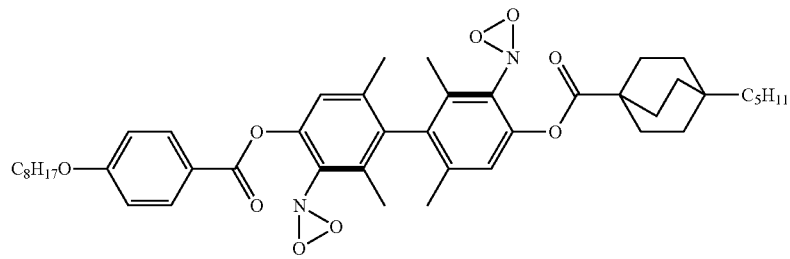
Formula 2-031

-continued
Formula 2-032
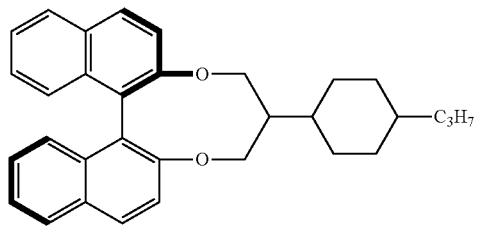
Formula 2-033
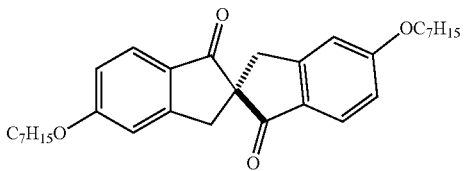
Formula 2-034
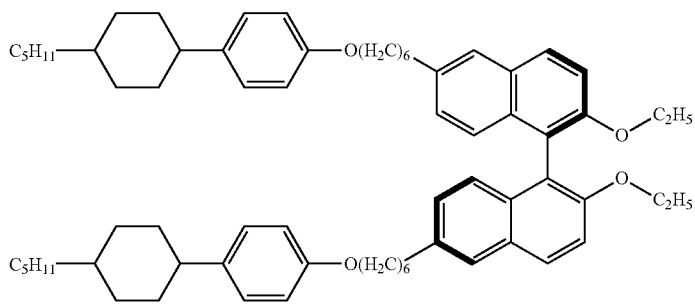
Formula 2-035
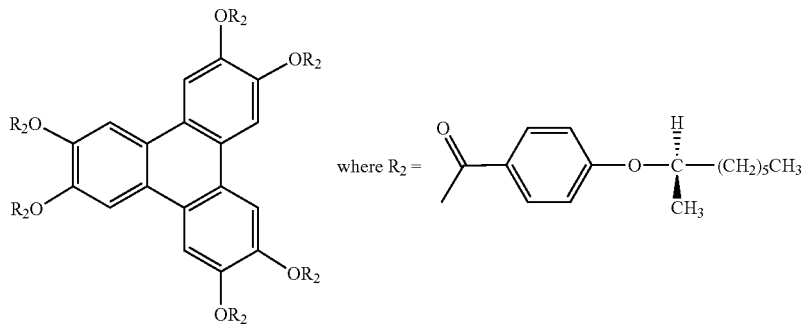
Formula 2-036
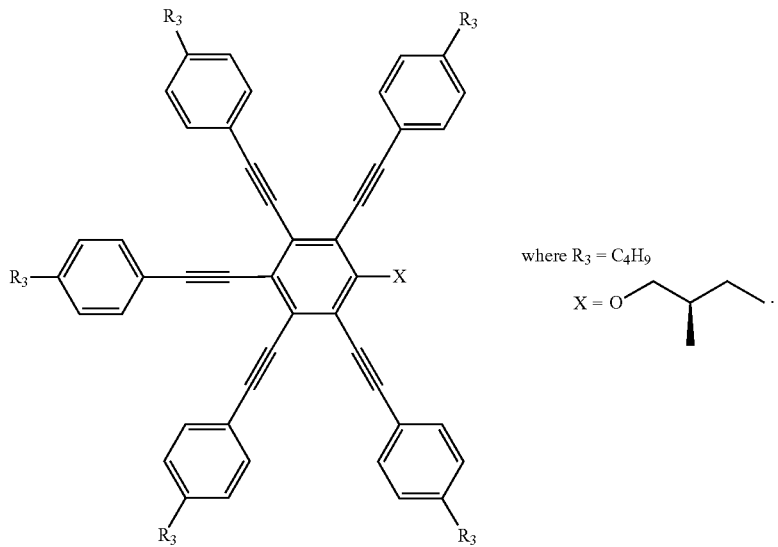

In some embodiments, the plurality of helically arranged liquid crystals includes one or more non-cholesteric liquid crystals and chiral dopants.

In some embodiments, the non-cholesteric liquid crystals are selected from the group consisting of: $R_4$-A-$[L_1]$-B-$[L_2]$-C-$[L_3]$-D-$R_5$, where $R_4$ and $R_5$ are terminal groups selected from R', R'O, CN, NCS, $CF_3$, F, Cl, $NO_2$, alkenyl, OO=C—$CH_3$=$CH_2$, OO=C—CH=$CH_2$, where R' is $C_nH_{2n+1}$; A, B, C, and D are individually selected from the following formulas:

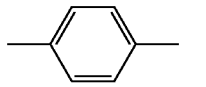

Formula 3-001

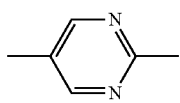

Formula 3-002

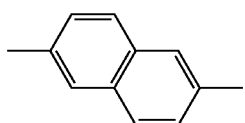

Formula 3-003

Formula 3-004

Formula 3-005

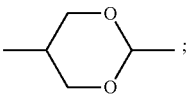

Formula 3-006 and $L_1$, $L_2$, and $L_3$ are individually selected linking groups selected from the group consisting of: a carbon single bond, a carbon double bond, a carbon triple bond, —COO—, $CH_2CH_2$—, $CH_2O$—, —CH=N—, —N=N—, and —N(O)=N—.

In some embodiments, the plurality of helically arranged liquid crystals includes one or more non-cholesteric liquid crystals selected from the group consisting of:

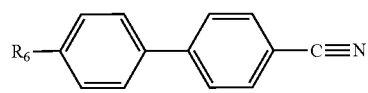

Formula 4-001

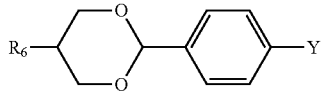

Formula 4-002

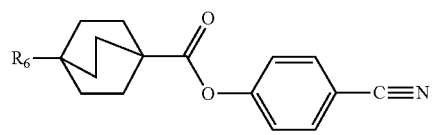

Formula 4-003

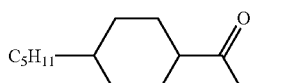

Formula 4-004

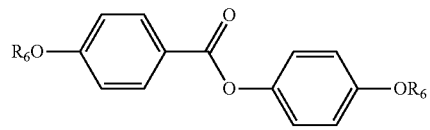

Formula 4-005

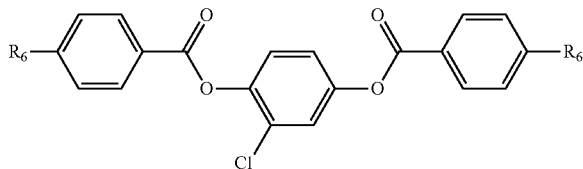

Formula 4-006

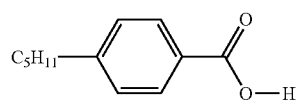

Formula 4-007

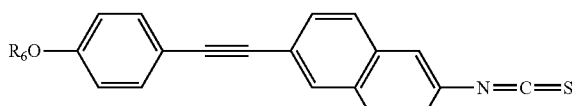

Formula 4-008

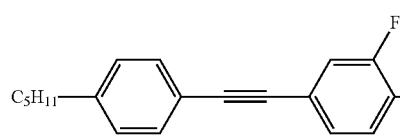

Formula 4-009

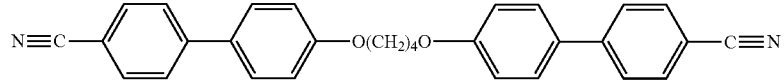

Formula 4-010

-continued
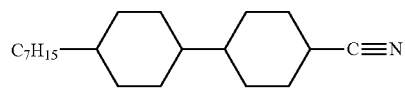
Formula 4-011
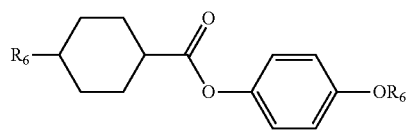
Formula 4-012
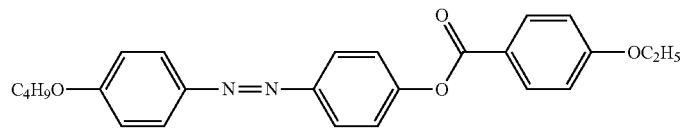
Formula 4-013
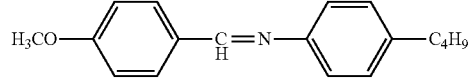
Formula 4-014
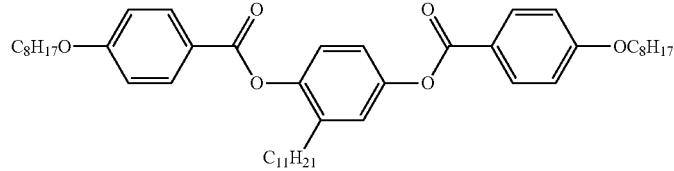
Formula 4-015
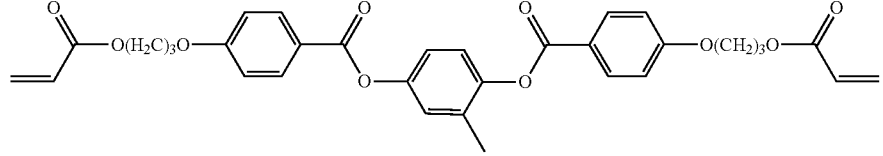
Formula 4-016
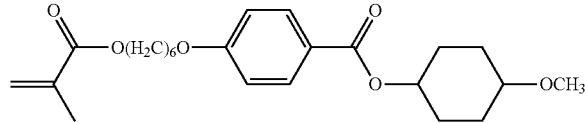
Formula 4-017
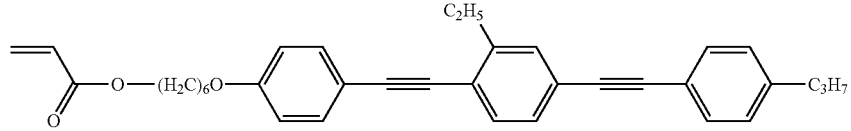
Formula 4-018
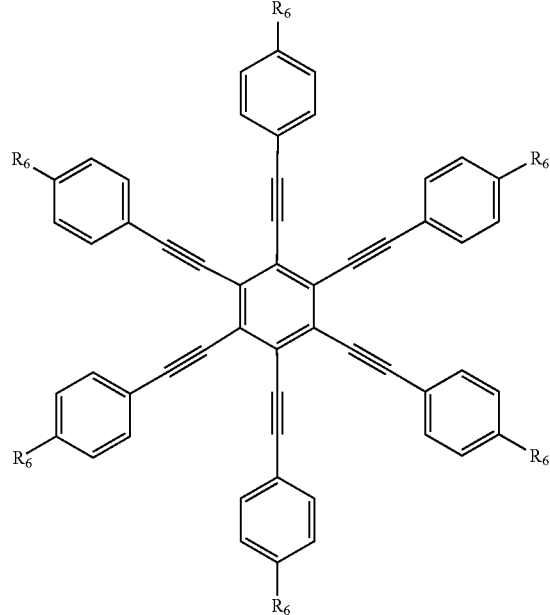
Formula 4-019

-continued

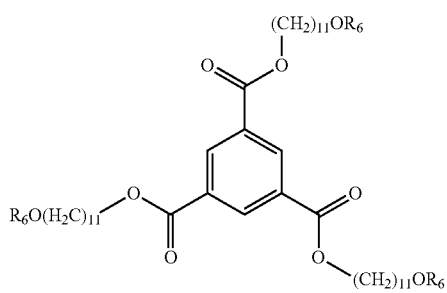

Formula 4-020 where $R_6$ is selected from $C_nH_{2n+1}$ and $C_nH_{2n+1}O$ and $X_3$ is a terminal group selected from R', R'O, CN, NCS, $CF_3$, F, Cl, $NO_2$, alkenyl, OO=C—$CH_3$=$CH_2$, OO=C—CH=$CH_2$, and where R' is $C_nH_{2n+1}$.

In some embodiments, the chiral dopants are selected from the group consisting of:

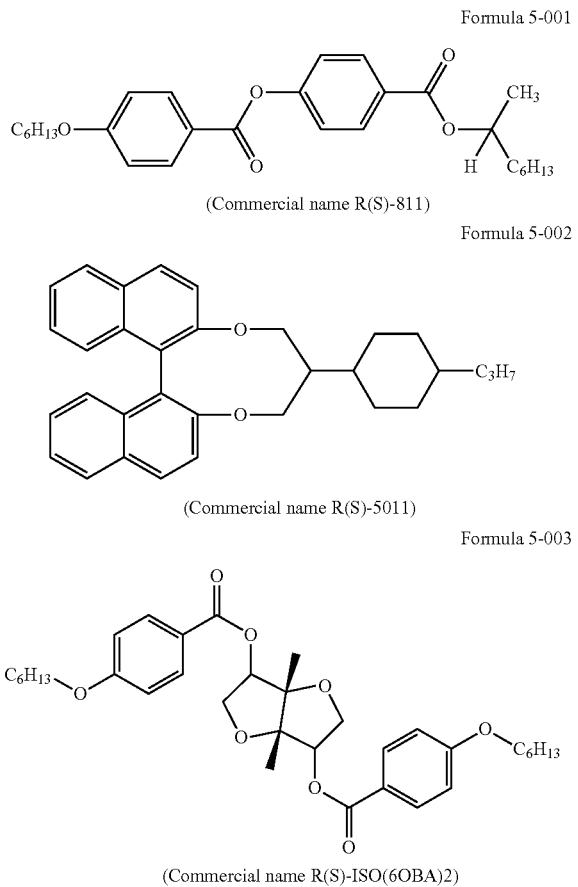

(Commercial name R(S)-811)

Formula 5-001

(Commercial name R(S)-5011)

Formula 5-002

(Commercial name R(S)-ISO(6OBA)2)

Formula 5-003

In some embodiments, the plurality of helically arranged liquid crystals (e.g., CLCs 102 in FIG. 1) are polymerized.

In some embodiments, the optical film has a first surface and an opposing second surface, and the plurality of helically arranged liquid crystals extend from the first surface to the second surface about an axis normal to the first surface. For example, helically shaped CLCs 102 extend between surfaces 100-1 and 100-2 of optical film 100 in FIG. 1.

In some embodiments, the optical film is a polarization selective and wavelength selective optical film. For example, optical film 100 operates as a polarization selective lens 300 described with respect to FIGS. 3A-3D or as a polarization selective grating 400 described with respect to FIGS. 4A-4D.

In accordance with some embodiments, a method of making an optical film includes obtaining a substrate with an alignment layer (e.g., obtaining substrate 202 and alignment layer 204 in FIG. 2A) and a film of a first solution on the alignment layer (e.g., applying a film of solution 206 on alignment layer 204 in FIG. 2B). The first solution includes liquid crystals (e.g. CLCs 208) and organic crystal molecules (e.g., organic crystal molecules 210). The liquid crystals form a plurality of helically arranged liquid crystals on the alignment layer. The method also includes forming organic solid crystal structures by crystallizing the organic crystal molecules (e.g., forming organic crystals 214 from organic crystal molecules 210 in FIG. 2D). The organic solid crystal structures at least partially surround the plurality of helically arranged liquid crystals.

In some embodiments, crystallizing the organic solid crystal structures (e.g., FIG. 2D) includes reducing a temperature of the solution including organic crystal molecules or by removing a solvent from the solution including organic crystal molecules.

In some embodiments, the method further includes pretreating the substrate, prior to applying the film of the first solution, to add the alignment layer. Pretreating the substrate includes generating a pattern on a surface of the substrate to form a patterned alignment layer or applying a coating of a photoalignment material on the surface of the substrate to form a photosensitive alignment layer.

In some embodiments, the solution (e.g., solution 206 in FIG. 2B) further includes a chiral dopant interacting with the liquid crystals thereby assisting in the formation of the plurality of helically arranged liquid crystals.

Although various drawings illustrate operations of particular components or particular groups of components with respect to one eye, a person having ordinary skill in the art would understand that analogous operations can be performed with respect to the other eye or both eyes. For brevity, such details are not repeated herein.

Terms, "and" and "or" as used herein, may include a variety of meanings that are also expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AC, BC, AA, ABC, AAB, AABBCCC, etc.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, systems, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing various embodiments. Various changes may be made in the function and arrangement of elements without departing from the spirit and scope of the present disclosure.

Although some of various drawings illustrate a number of logical stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. An optical film, comprising:
a plurality of helically arranged liquid crystals; and
organic solid crystal structures laterally surrounding the plurality of helically arranged liquid crystals.

2. The optical film of claim 1, wherein the organic solid crystal structures conform to shapes of the plurality of helically arranged liquid crystals.

3. The optical film of claim 1, wherein the organic solid crystal structures define a plurality of helically shaped cavities, in which the plurality of helically arranged liquid crystals is located.

4. The optical film of claim 1, wherein an index of refraction of the optical film is at least 1.9.

5. The optical film of claim 1, wherein the organic solid crystal structures include one or more polycyclic aromatic hydrocarbons selected from a group consisting of naphthalene, anthracene, tetracene, pentacene, pyrene, polycene, fluoranthene, benzophenone, benzochromene, benzil, benzimidazole, benzene, hexachlorobenzene, nitropyridine-N-oxide, benzene-1,4-dicarboxylic acid, diphenylacetylene, N-(4-nitrophenyl)-(s)-prolinal, 4,5-dicyanoimidazole, benzodithiophene, cyanopyridine, thienothiophene, stilbene, azobenzene, and their derivatives.

6. The optical film of claim 1, wherein the organic solid crystals include one or more organic ring structures that include (i) one or more saturated cyclic compounds selected from a group consisting of cyclohexane, cyclopentane, tetrahydropyran, piperidine, tetrahydrofuran, pyrrolidine, tetrahydrothiophene and their derivatives and (ii) one or more unsaturated aromatic compounds selected from a group consisting of benzene, naphthalene, anthracene, thiophene, bi-phenyl, tolane, benzimidazole, diphenylacetylene, cyanopyridine, thienothiophene, dibenzothiophene, carbazole, silafluorene and their derivatives.

7. The optical film of claim 6, wherein the one or more organic ring structures are coupled with one or more terminal groups selected from the group consisting of $C_1$-$C_{10}$ alkyl, alkenyl, —CN, —NCS, —SCN, —SF$_5$, —Br, —Cl, —F, —OCF$_3$, —CF$_3$, mono- or polyfluorinated $C_1$-$C_{10}$ alkyl, and alkoxy.

8. The optical film of claim 1, wherein the plurality of helically arranged liquid crystals includes one or more liquid crystals selected from the group consisting of:

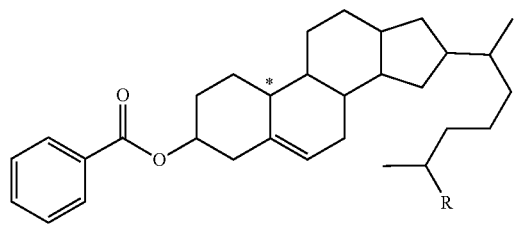

Formula 1-001

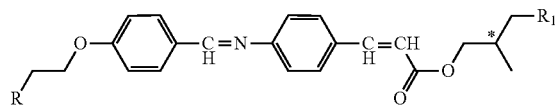

Formula 1-002

-continued

Formula 1-003

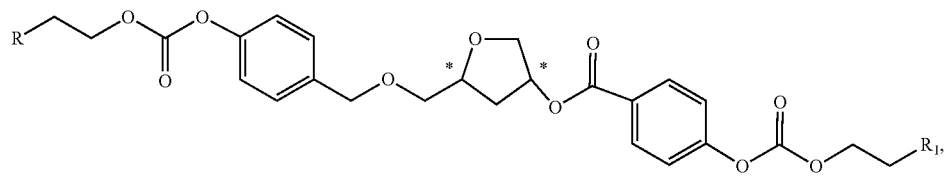

wherein:
R is independently selected from the group consisting of: H or $(CH_2)_{n1}CH_2X_1$; and
$R_1$ is independently selected from the group consisting of: H or $(CH_2)_{n2}CH_2X_1$, where $X_1$ is acrylate, methacrylate, vinyl acrylate, or H, wherein $n_1$ and $n_2$ ranges from zero to eight.

9. The optical film of claim 1, wherein the plurality of helically arranged liquid crystals includes one or more liquid crystals selected from the group consisting of:

Formula 2-001

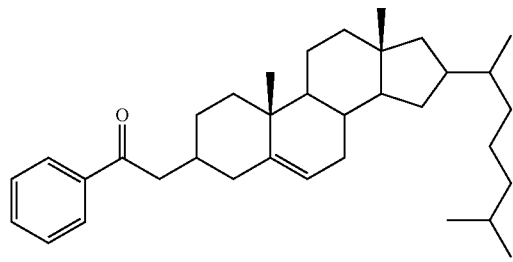

Formula 2-002

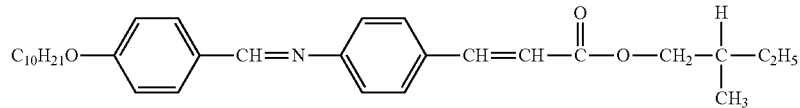

Formula 2-003

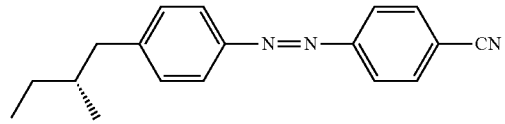

Formula 2-004

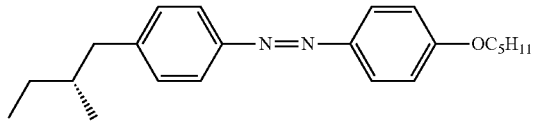

Formula 2-005

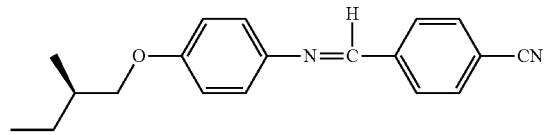

Formula 2-006

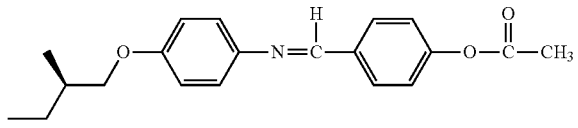

Formula 2-007

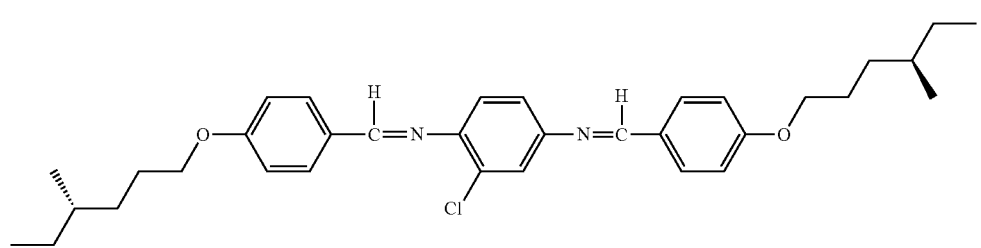

Formula 2-008

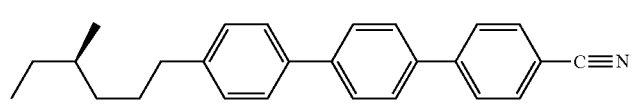

-continued
Formula 2-009
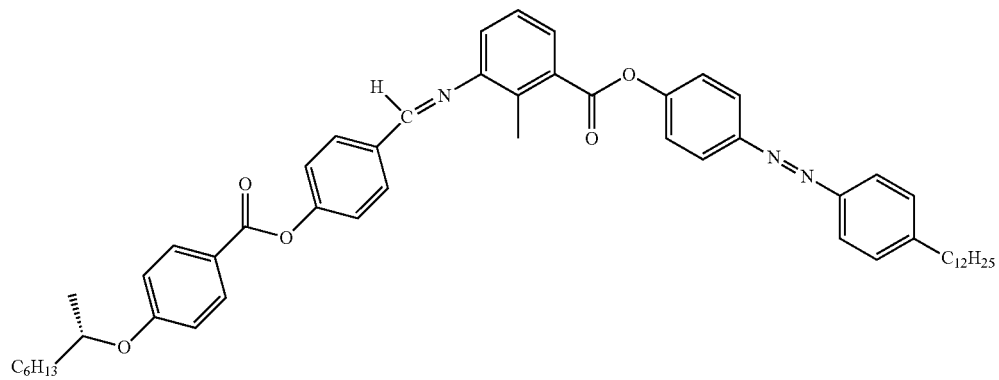
Formula 2-010 Formula 2-011
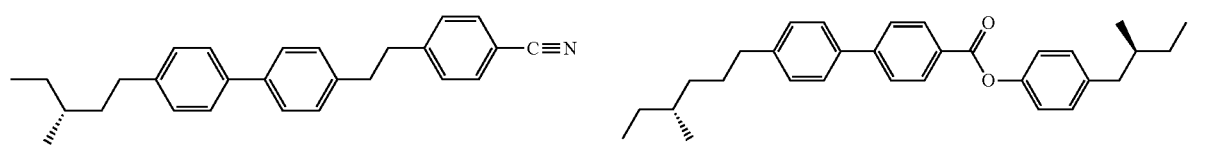
Formula 2-012 Formula 2-013
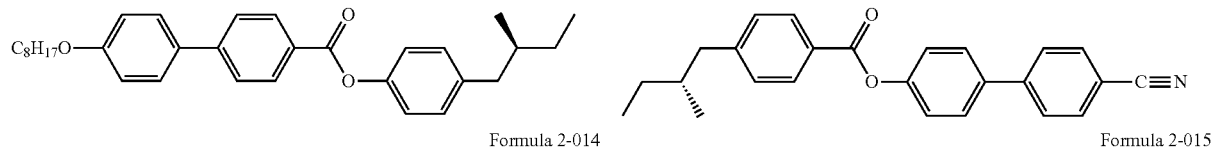
Formula 2-014 Formula 2-015
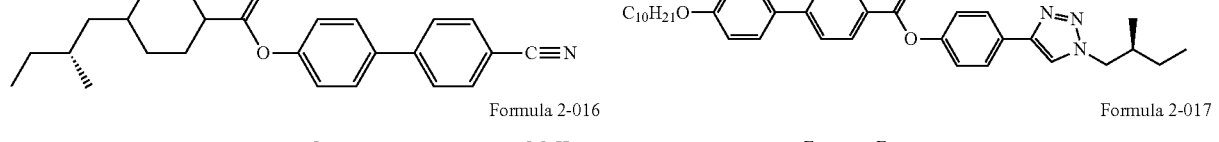
Formula 2-016 Formula 2-017
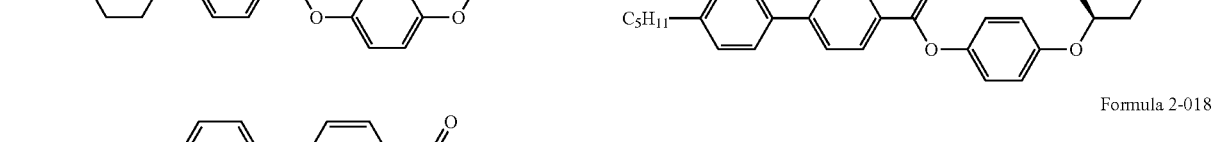
Formula 2-018
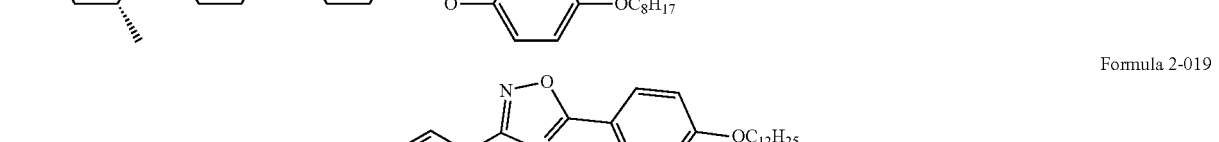
Formula 2-019
Formula 2-020 Formula 2-021
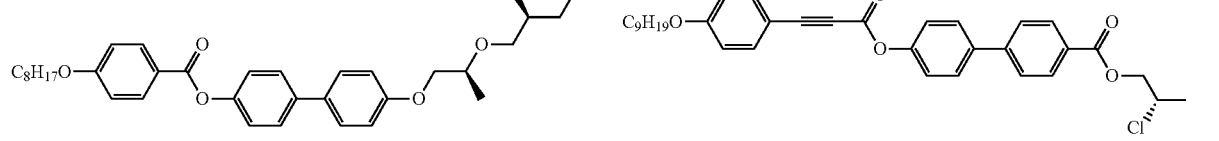

Formula 2-022
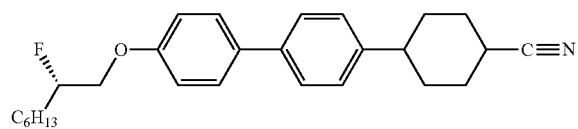
Formula 2-023
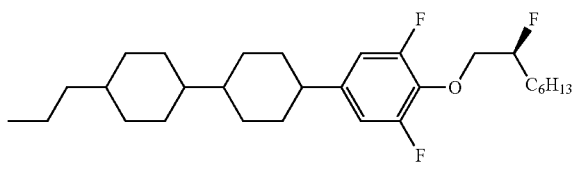
Formula 2-024
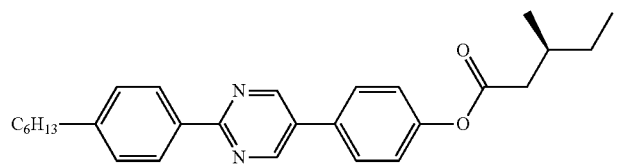
Formula 2-025
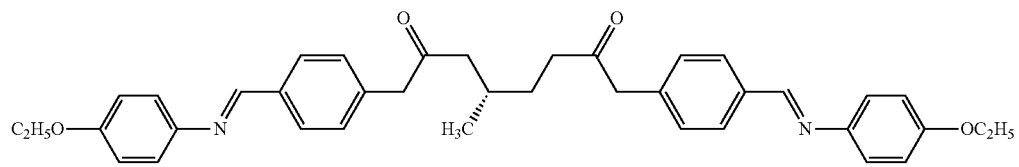
Formula 2-026
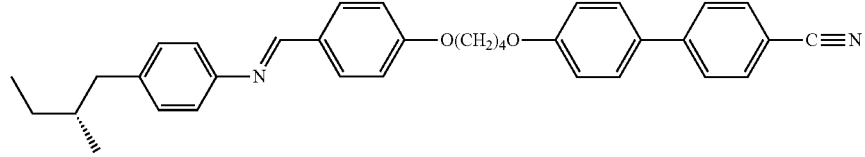
Formula 2-027
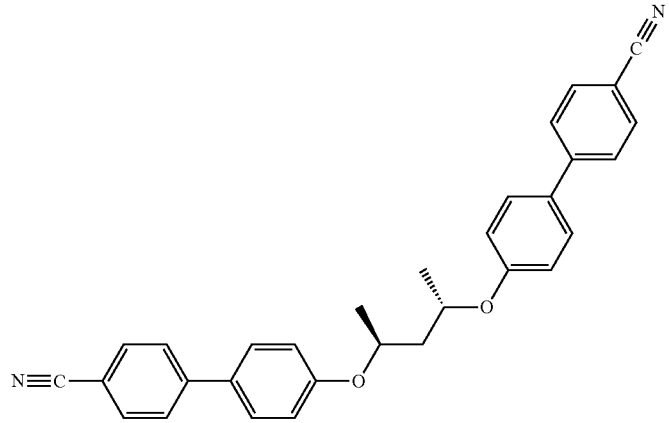
Formula 2-028
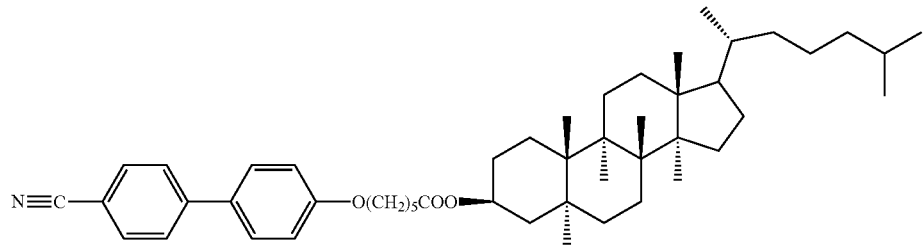
Formula 2-029
Formula 2-030
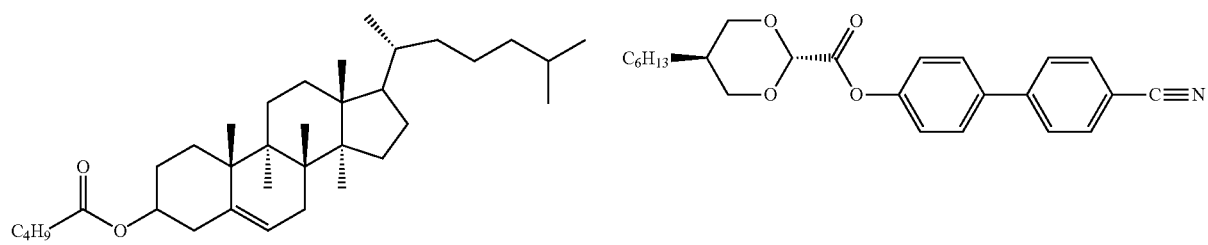

-continued
Formula 2-031
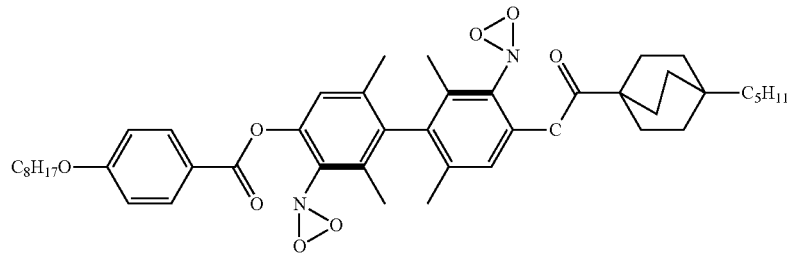
Formula 2-032
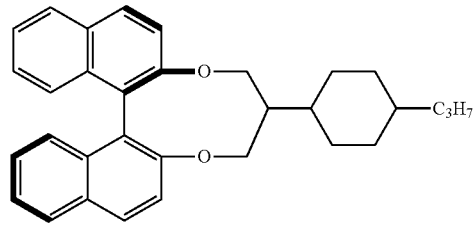
Formula 2-033
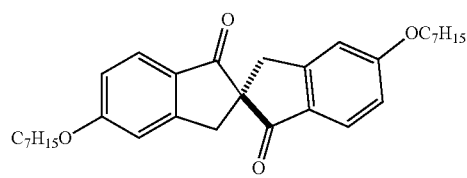
Formula 2-034
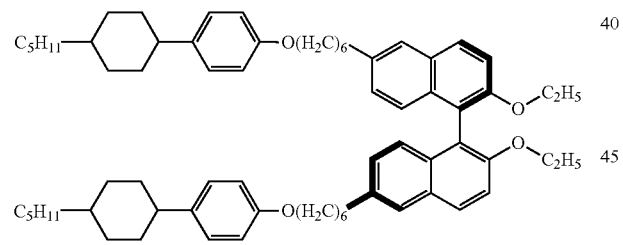
Formula 2-035
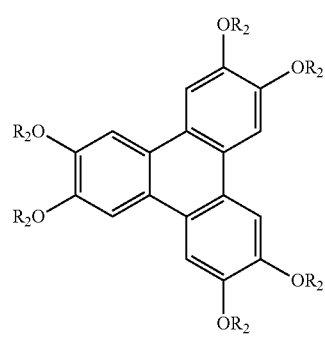
-continued
Formula 2-036
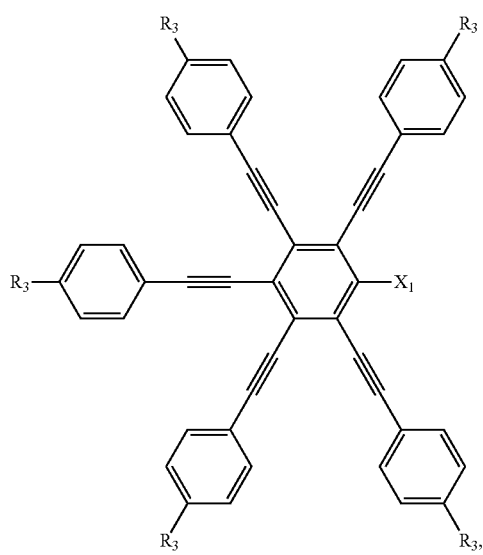
wherein
$R_2$ is 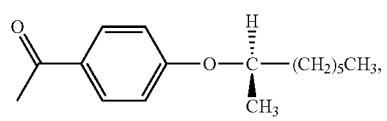,
$R_3$ is C4H9, and $X_1$ is .
10. The optical film of claim 1, wherein the plurality of helically arranged liquid crystals includes one or more non-cholesteric liquid crystals and chiral dopants.

11. The optical film of claim 10, wherein the non-cholesteric liquid crystals are selected from the group consisting of:

R₄-A-[L₁]-B-[L₂]-C-[L₃]-D-R₅, wherein:
- R₄ and R₅ are terminal groups selected from R', R'O, CN, NCS, CF₃, F, Cl, NO₂, alkenyl, OO=C—CH₃=CH₂, OO=C—CH=CH₂, wherein R' in C_nH_{2n+1};
- A, B, C, and D are individually selected from the group consisting of:

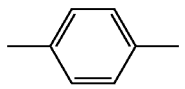
Formula 3-001

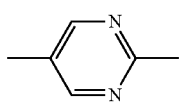
Formula 3-002

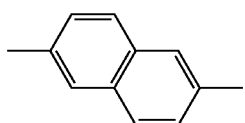
Formula 3-003

Formula 3-004

Formula 3-005

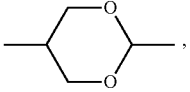
Formula 3-006 and L₁, L₂, and L₃ are individually selected linking groups selected from the group consisting of: a carbon single bond, a carbon double bond, a carbon triple bond, —COO—, CH₂CH₂, CH₂O—, —CH=N—, —N=N—, and —N(O)=N—.

12. The optical film of claim 10, wherein the plurality of helically arranged liquid crystals includes one or more non-cholesteric liquid crystals selected from the group consisting of:

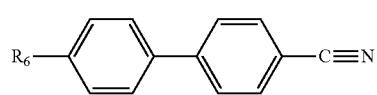
Formula 4-001

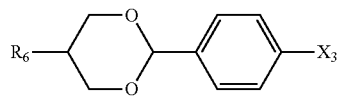
Formula 4-002

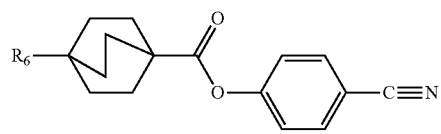
Formula 4-003

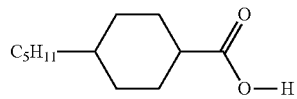
Formula 4-004

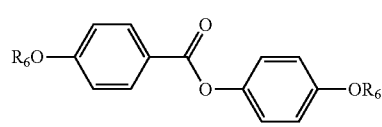
Formula 4-005

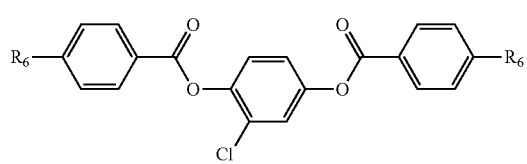
Formula 4-006

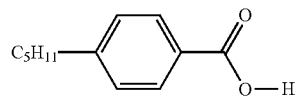
Formula 4-007

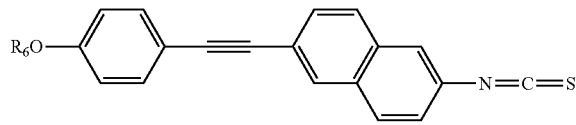
Formula 4-008

-continued
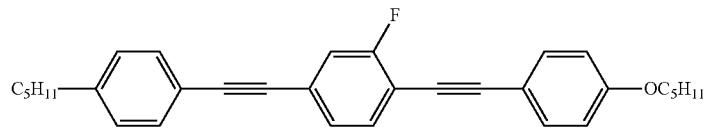
Formula 4-009
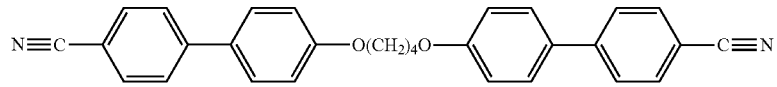
Formula 4-010
Formula 4-011
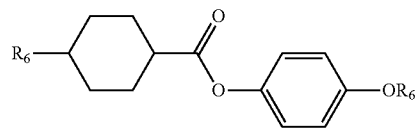
Formula 4-012
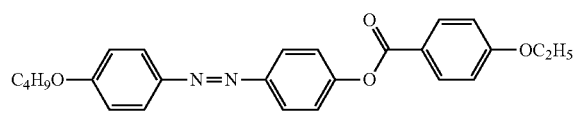
Formula 4-013
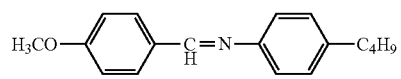
Formula 4-014
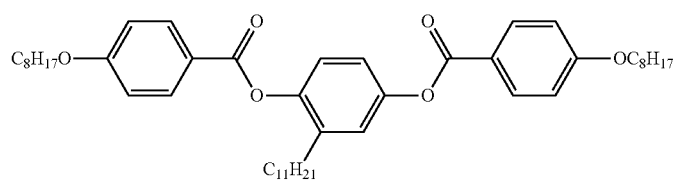
Formula 4-015
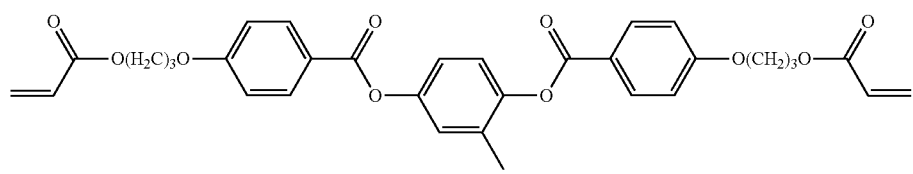
Formula 4-016
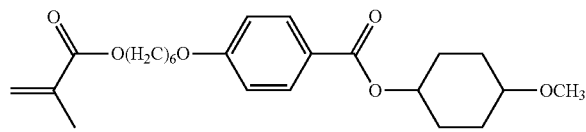
Formula 4-017
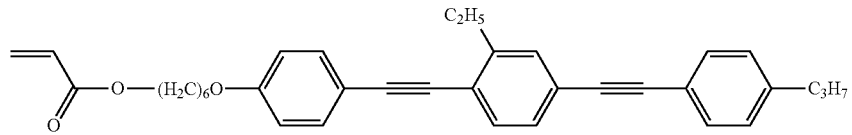
Formula 4-018

63

-continued

Formula 4-019

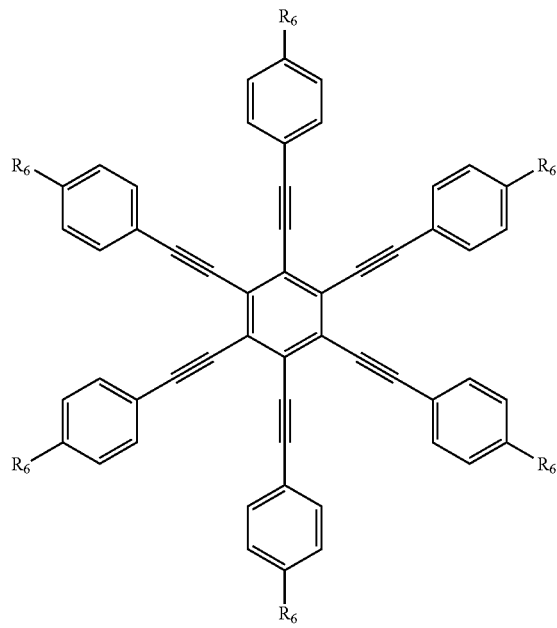

Formula 4-020

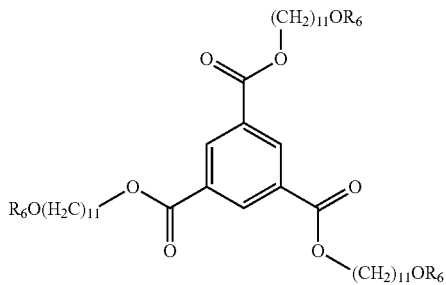

wherein:

$R_6$ is selected from $C_nH_{2n+1}$ and $C_nH_{2n+1}O$; and $X_3$ is a terminal group selected from R', R'O, CN, NCS, $CF_3$, F, Cl, $NO_2$, alkenyl, OO=C—$CH_3$=$CH_2$, OO=C—CH=$CH_2$, wherein R' is $C_nH_{2n+1}$.

13. The optical film of claim 10, wherein the chiral dopants are selected from the group consisting of:

Formula 5-001

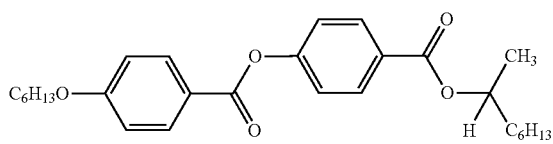

Formula 5-002

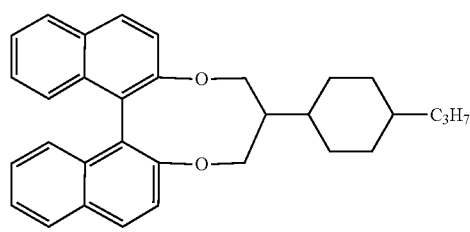

64

-continued

Formula 5-003

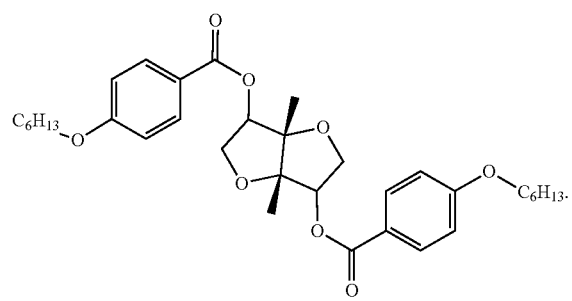

14. The optical film of claim 1, wherein the plurality of helically arranged liquid crystals are polymerized.

15. The optical film of claim 1, wherein the optical film has a first surface and an opposing second surface, and the plurality of helically arranged liquid crystals extend from the first surface to the second surface about an axis normal to the first surface.

16. The optical film of claim 1, wherein the organic solid crystal structures have a first surface and an opposing second surface, and the plurality of helically arranged liquid crystals extend from the first surface to the second surface about an axis normal to the first surface.

17. The optical film of claim 1, wherein the optical film is a polarization selective and wavelength selective optical film.

18. The optical film of claim 1, wherein an index of refraction of the organic solid crystal structures is at least 1.9.

* * * * *